(12) United States Patent
Ohtake et al.

(10) Patent No.: US 8,458,959 B2
(45) Date of Patent: Jun. 11, 2013

(54) VEHICLE DOOR FRAME STRUCTURE

(75) Inventors: Yasuhiro Ohtake, Kanagawa (JP);
Kenji Murata, Kanagawa (JP);
Shigenobu Ohsawa, Kanagawa (JP);
Jiro Yoshihara, Kanagawa (JP)

(73) Assignee: Shiroki Corporation, Fujisawa-Shi (JP)

( * ) Notice: Subject to any disclaimer, the term of this patent is extended or adjusted under 35 U.S.C. 154(b) by 366 days.

(21) Appl. No.: 12/593,645

(22) PCT Filed: Mar. 28, 2008

(86) PCT No.: PCT/JP2008/056047
§ 371 (c)(1),
(2), (4) Date: Jan. 24, 2011

(87) PCT Pub. No.: WO2008/123409
PCT Pub. Date: Oct. 16, 2008

(65) Prior Publication Data
US 2011/0099912 A1    May 5, 2011

(30) Foreign Application Priority Data
Mar. 30, 2007  (JP) ................................. 2007-093368
Mar. 30, 2007  (JP) ................................. 2007-095437
Apr. 27, 2007  (JP) ................................. 2007-117907

(51) Int. Cl.
*B60J 5/04*   (2006.01)

(52) U.S. Cl.
USPC .......................................... 49/502; 49/479.1

(58) Field of Classification Search
USPC .......... 49/479.1, 440, 441, 502, 475.1, 498.1, 49/495.1
See application file for complete search history.

(56) References Cited

U.S. PATENT DOCUMENTS
1,914,216 A * 6/1933 Schlegel ......................... 49/440
4,729,593 A * 3/1988 Nisiguchi et al. ............. 296/154
(Continued)

FOREIGN PATENT DOCUMENTS
JP    03 276817        9/1991
JP    03276817 A      12/1991
(Continued)

OTHER PUBLICATIONS
Aisin Seiki Co Ltd., "Door Frame," Patent Abstracts of Japan, Publication Date: Jun. 16, 2005; English Abstract of JP-2005 153767.
(Continued)

*Primary Examiner* — Katherine Mitchell
*Assistant Examiner* — Justin Rephann
(74) *Attorney, Agent, or Firm* — Millen, White, Zelano, Branigan, P.C.

(57) ABSTRACT

A vehicle door frame structure has an upper sash member located along a roof panel of a vehicle body and also has a vertical pillar sash member located along a center pillar of the vehicle body. The upper sash member has, at its linear end joined to the vertical pillar sash member side, an aesthetically designed section and an inner frame portion. The aesthetically designed section is located on the outer side of the door, and the inner frame portion is located closer to the vehicle interior than the aesthetically designed section and is shorter in length than the aesthetically designed section. The vertical pillar sash member has at its upper end a superposed contact section that is superposed, in the direction of the thickness of the door, on an end of the inner frame portion of the upper sash member, and the superposed contact section and the inner frame portion are joined together while being superposed on each other.

6 Claims, 26 Drawing Sheets

U.S. PATENT DOCUMENTS

| | | | | |
|---|---|---|---|---|
| 4,838,607 A | * | 6/1989 | Mizuma et al. | 296/219 |
| 4,910,918 A | * | 3/1990 | Naples et al. | 49/441 |
| 4,956,941 A | * | 9/1990 | Vaughan | 49/440 |
| 5,127,193 A | * | 7/1992 | Okada et al. | 49/495.1 |
| 5,493,814 A | * | 2/1996 | Christian | 49/479.1 |
| 5,524,388 A | * | 6/1996 | Chowdhury et al. | 49/374 |
| 5,566,510 A | * | 10/1996 | Hollingshead et al. | 49/479.1 |
| 5,718,084 A | * | 2/1998 | Takamiya | 49/440 |
| 5,839,232 A | * | 11/1998 | Backes et al. | 49/479.1 |
| 6,802,666 B1 | * | 10/2004 | Bormann et al. | 403/233 |
| 7,093,393 B2 | * | 8/2006 | Hock et al. | 49/502 |
| 7,152,373 B2 | * | 12/2006 | Hoffman et al. | 49/502 |
| 7,350,849 B2 | * | 4/2008 | Roush et al. | 296/146.9 |
| 7,390,050 B2 | * | 6/2008 | Nakao et al. | 296/146.1 |
| 2004/0123526 A1 | * | 7/2004 | Hock et al. | 49/502 |
| 2004/0221512 A1 | * | 11/2004 | Hoffman et al. | 49/440 |
| 2005/0204634 A1 | * | 9/2005 | Nozaki et al. | 49/441 |
| 2007/0084130 A1 | * | 4/2007 | Gaustad et al. | 49/502 |

FOREIGN PATENT DOCUMENTS

| | | |
|---|---|---|
| JP | 03276817 W | 12/1991 |
| JP | 1159185 A | 3/1999 |
| JP | 1159185 W | 3/1999 |
| JP | 2001 253239 | 9/2001 |
| JP | 2001253239 A | 9/2001 |
| JP | 2001253239 W | 9/2001 |
| JP | 2002127749 A | 5/2002 |
| JP | 2002127749 W | 5/2002 |
| JP | 2003 72383 | 3/2003 |
| JP | 2004338612 | 5/2003 |
| JP | 2005 153767 | 6/2005 |
| JP | 2005313697 A | 10/2005 |
| JP | 2005313697 W | 10/2005 |
| JP | 2007 062637 | 3/2007 |
| JP | 200762637 A | 3/2007 |
| JP | 200762637 W | 3/2007 |
| WO | PCTJP2008056047 R | 7/2008 |

OTHER PUBLICATIONS

Mazda Motor Corp., "Door sash structure for vehicle," Patent Abstracts of Japan, Publication Date: Dec. 9, 1991; English Abstract of JP-03 276817.

Nissan Motor Co Ltd., "Connecting structure for door sash upper part," Patent Abstracts of Japan, Publication Date: Sep. 18, 2001; English Abstract of JP-2001 253239.

Office Action for related Japanese Application No. 2009 245582 dated Oct. 28, 2011.

Shiroki Corp., "Sash connecting structure of door frame," Patent Abstracts of Japan, Publication Date: Mar. 15, 2007; English Abstract of JP-2007 062637.

Ota Hidemasa, Abstract of Japanese Application No. 2004-338612 "Door sash for vehicle", published Dec. 12, 2004.

JPO. "Official Action." JP2007-95437. Applicant: Shiroki Corporation. Issued: Aug. 25, 2009.

Honda Motor Co Ltd, Sankei Giken Kogyo Co Ltd., "Molding fixing structure of sash door for automobile," Patent Abstracts of Japan, Publication Date: Mar. 12, 2003; English Abstract of JP-2003 072383.

Office Action for related Japanese Patent Application No. 2007 117909 dated Nov. 30, 2012.

English translation of Office Action for related Japanese Patent Application No. 2007 117909 dated Nov. 30, 2012.

* cited by examiner

VEHICLE DOOR FRAME STRUCTURE

TECHNICAL FIELD

This invention concerns the doorframe structure of the vehicle, and in particular, relates to a joint structure of an upright-pillar sash member and an upper sash member. Here, note that the upright-pillar sash member extends in the up-and-down direction of the door, and the upper sash member forms an upper edge of the vehicle door.

DESCRIPTION OF THE RELATED ART

As an invention directed to enhance productivity of a joint portion of an upright-pillar sash member and an upper sash member, Japanese unexamined patent publication No. 2004-388612 would be an example. In Japanese unexamined patent publication No. 2004-338612, a design portion of the upper sash member which is exposed outside of the vehicle door (can be viewed from outside) extends to an upper edge portion of the upright-pillar sash member without cutting any portions of the upper sash member; and, an inner-frame portion inside of the vehicle is formed shorter than the design portion by cutting the end portion of the inner-frame portion. At each of the end portion of the inner-frame portion of the upper sash member and the end portion of an inner-frame portion of the upright-pillar sash member, oblique connecting-end-portions (surfaces) which face each other are formed. The oblique connecting-end-portion (surface) of the upper sash member abuts on the oblique connecting-end-portion (surface) of the upright-pillar sash member in order to fix the upper sash member and the upright-pillar sash member. Due to this structure, no welding scar is on the design portion, so that polishing to remove a welding scar on the design portion becomes unnecessary.

SUMMARY OF THE INVENTION

However, in the joint structure such as disclosed in Japanese Unexamined Patent Publication No. 2004-388612, in which opposed end surfaces of an upper sash member and an upright-pillar sash member are butt-joined to each other, accuracy control for the butt-joined end surfaces in particular must be done precisely, and there is still room for improvement in productivity.

Accordingly, an object of the present invention is to provide a vehicle door frame structure which makes it possible to join an upper sash member and an upright-pillar sash member to each other easily and securely, thus featuring high productivity, and which further makes it possible to achieve an improvement in outward appearance.

According to a first aspect of the present invention, in a vehicle door frame structure, an upright-pillar sash member elongated in a vertical direction of a vehicle door and an upper sash member, which is formed as a separate member from the upright-pillar sash member and forms an upper edge of the vehicle door, are joined together at an upper end of the upright-pillar sash member. An end portion of the upper sash member on the upright-pillar sash member side is linear in shape, and at the linear end portion the upper sash member comprises a designed portion (22) exposed outside of the vehicle door, and an inner frame portion which is formed as a hollow cylindrical shape and is positioned closer to an inside of the vehicle than the designed portion. The upright-pillar sash member comprises, at an upper end thereof, a superposed contact portion which has a cup-shaped cross sectional shape being formed by pressing, and which is to be inserted into and superposed on an end of the hollow cylindrical inner frame portion of the upper sash member in a direction of thickness of the vehicle door. The inserted and superposed contact portion and the inner frame portion are joined together, while being superposed on each other.

The inner frame portion is preferably shorter in length than the designed portion.

The upright-pillar sash member is preferably constituted by an arc-shaped bent portion at an upper end of a linear portion of the upright-pillar sash member which extends in the up-and-down direction. The arc-shaped bent portion is curved toward the linear end portion of the upper sash member. The inserted and superposed contact portion is formed on said arc-shaped bent portion.

The linear portion of the upright-pillar sash member is preferably formed along a center pillar.

According to the present invention, the upper sash member and the upright-pillar sash member can be joined together easily and securely without the need for advanced accuracy control because the upper sash member and the upright-pillar sash member are superposed on each other in the direction of the thickness of the vehicle door in a frame portion positioned closer to the inside of the vehicle than the designed portion.

DETAILED DESCRIPTION OF THE PREFERRED EMBODIMENTS

First Embodiment

FIGS. 1 through 14 show a first embodiment of a vehicle door frame structure according to the present invention.

Figure 1:
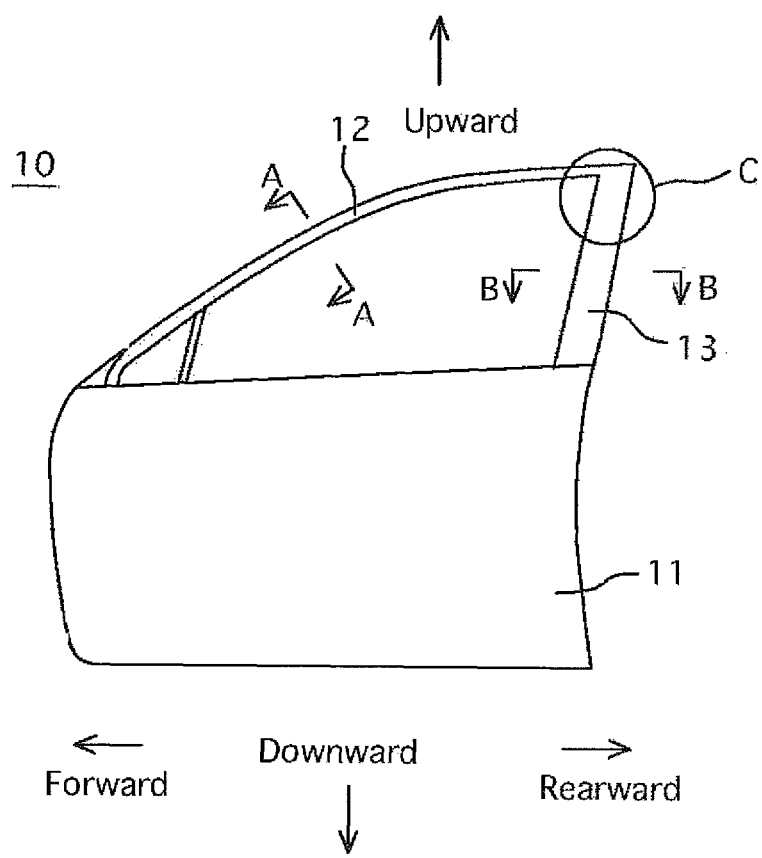
FIG. 1 is a side view of a vehicle door to which a door frame structure according to the present invention has been applied.

A motor-vehicle side door 10 shown in FIG. 1 is provided with a door panel 11, an upper sash (upper sash member) 12 that extends along a door opening of a roof panel 50 (shown by an imaginary line in FIG. 2) of a vehicle body, and a side sash (upright-pillar sash member) 13 that extends vertically along a center pillar 51 (shown by an imaginary line in FIG. 3) of the vehicle body from rear of the door panel 11. The door 10 of the present embodiment is a front seat door, and the forward/rearward direction which will be mentioned in the following descriptions designates a direction determined with reference to the front seat door 10. However, the present invention is not limited to the front seat door and can also be applied to a rear seat door or other doors.

Figure 2:
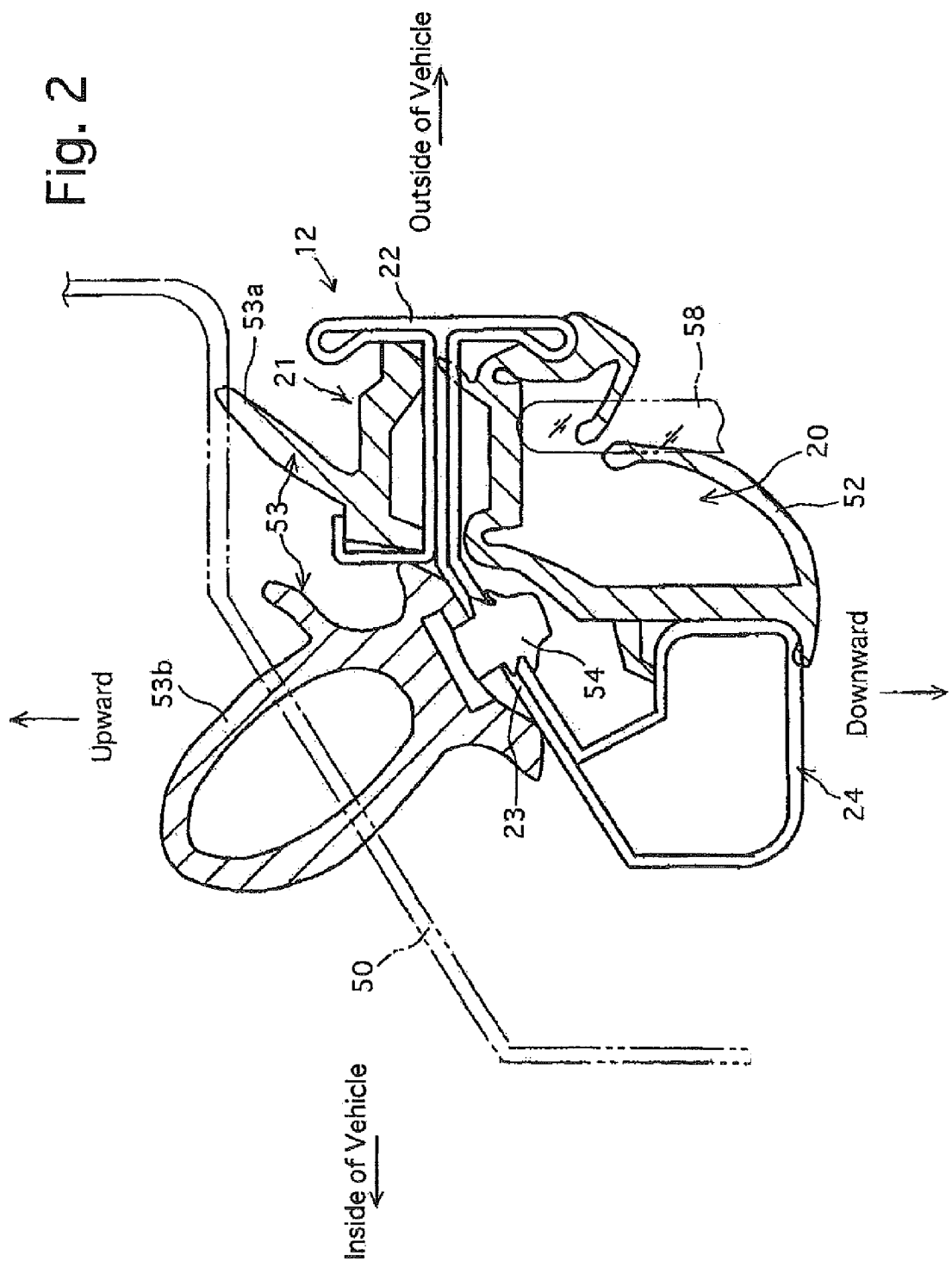
FIG. 2 is a cross sectional view of an upper sash taken along the A-A line shown in FIG. 1.

As shown in FIG. 2, the upper sash 12 is provided with a glass-run retaining part (retaining channel) 20 in which a glass run 52 is fitted to be retained thereby, and a weather strip retaining part (retaining channel) 21 which is positioned behind the glass-run retaining part 20 to retain a lip 53a of the weather strip 53. A flange-shaped designed portion 22 which faces toward the outside of the vehicle is formed on sides of the glass-run retaining part 20 and the weather strip retaining part 21. A connecting arm portion 23 extends from the glass-run retaining part 20 and the weather strip retaining part 21 toward the inside of the vehicle, away from the designed portion 22. A main frame portion (inner frame portion) 24 having a polygonal-tubular (sac-shaped) hollow sectional shape is formed on an end of the connecting arm portion 23. A hollow sealing portion 53b of the weather strip 53 is supported by the connecting arm portion 23 thereon using a clip 54. The glass run 52 and the weather strip 53 (the lip portion 53a and the hollow sealing portion 53b) are each made of an elastic material such as rubber. The glass run 52 elastically holds the upper edge of a window pane 58 (shown by lines in FIGS. 2 and 3) when the window pane 58 is raised. When the door 10 is in a closed state, the lip portion 53a and the hollow sealing portion 53b of the weather strip 53 are in contact with the roof panel 50 and are elastically deformed to prevent water droplets from entering inside the vehicle.

Figure 3:
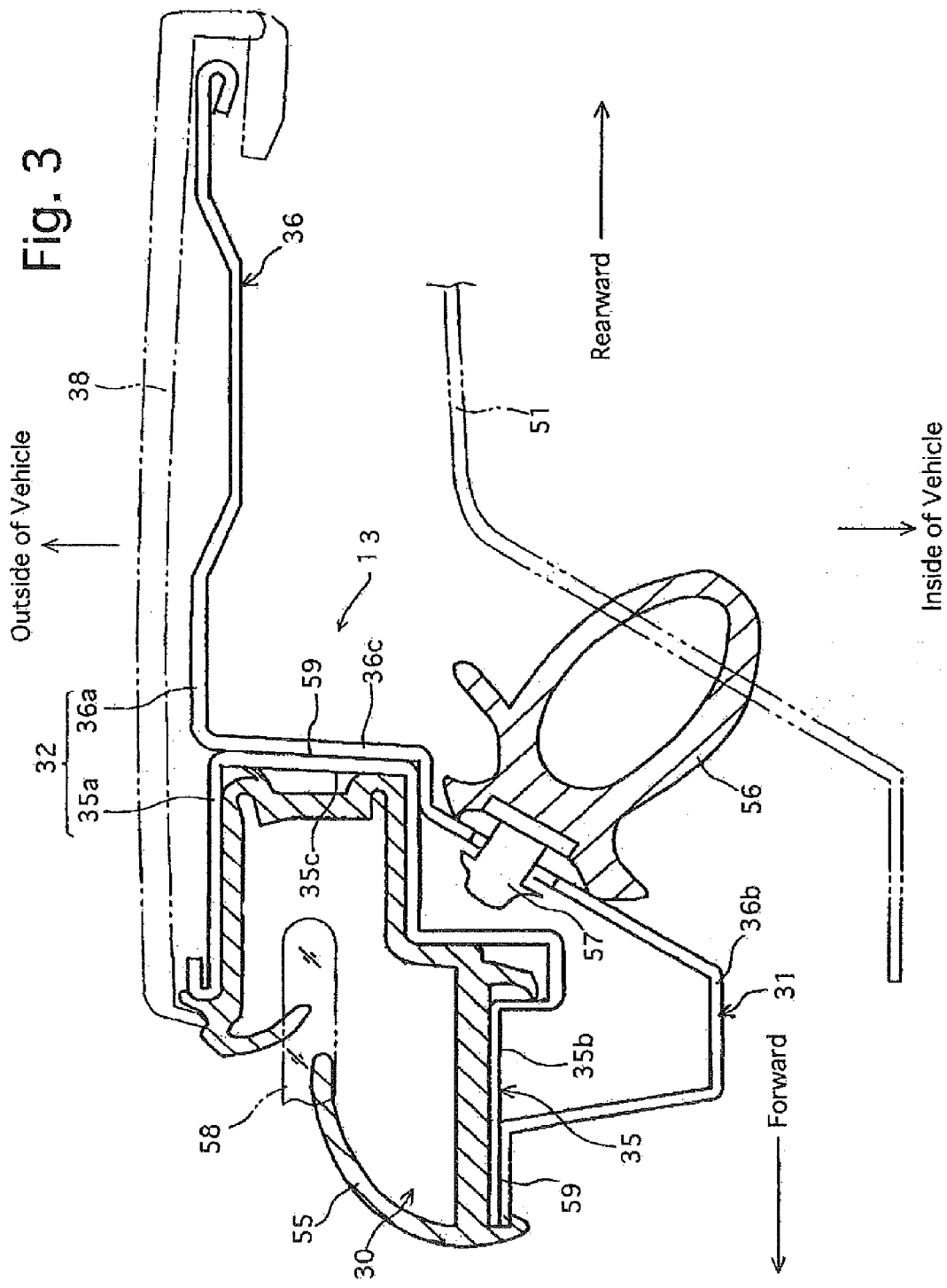
FIG. 3 is a cross sectional view of a side sash taken along the B-B line shown in FIG. 1.

As shown in FIG. 3, the side sash 13 is composed of an upright-pillar guide member 35 and an upright-pillar inner member 36. The upright-pillar guide member 35 is formed into a substantially U-shape in cross section which is open toward the front of the vehicle, and is provided with an outer surface portion 35a which faces toward the outside of the vehicle. An inner surface portion 35b faces toward the inside of the vehicle. A connecting portion 35c connects the outer surface portion 35a and the inner surface portion 35b. The upright-pillar inner member 36 is provided with an outer surface portion 36a which extends substantially parallel to the outer surface portion 35a of the upright-pillar guide member 35. An inwardly projecting portion 36b is formed to project toward the inside of the vehicle to be positioned close to the center pillar 51. A connecting portion 36c connects the outer surface portion 36a and the inwardly projecting portion 36b. The upright-pillar guide member 35 and the upright-pillar inner member 36 are fixed to each other by spot welding at positions 59 (front end portions of the inner surface portion 35b and the inwardly projecting portion 36b, and the connecting portions 35c and 36c) shown in FIG. 3.

In the side sash 13, the area surrounded by the outer surface portion 35a, the inner surface portion 35b and the connecting portion 35c forms a glass-run retaining part (retaining groove) 30. A glass run 55 for elastically holding the rear edge of the window pane 58 is fitted into the glass-run retaining part 30 to be retained thereby. In addition, the area surrounded by the inner surface portion 35b of the upright-pillar guide portion 35 and the inwardly projecting portion 36b of the upright-pillar inner member 36 defines a main frame portion 31 having a polygonal-tubular (sac-shaped) hollow sectional shape in the side sash 13. A weather strip 56 (hollow sealing portion) is fixed to the inwardly projecting portion 36b, which serves as an element of the main frame portion 31, via a clip 57. When the door 10 is closed, the weather strip comes into contact with the center pillar 51 and is elastically deformed, thereby preventing water droplets from entering the inside of the vehicle. In addition, the outer surface portion 35a of the upright-pillar guide member 35 and the outer surface portion 36a of the upright-pillar inner member 36 form a designed portion 32 in the side sash 13. A garnish 38 (shown by imaginary lines in FIG. 3) is mounted to an outer side of the designed portion 32.

Figure 4:
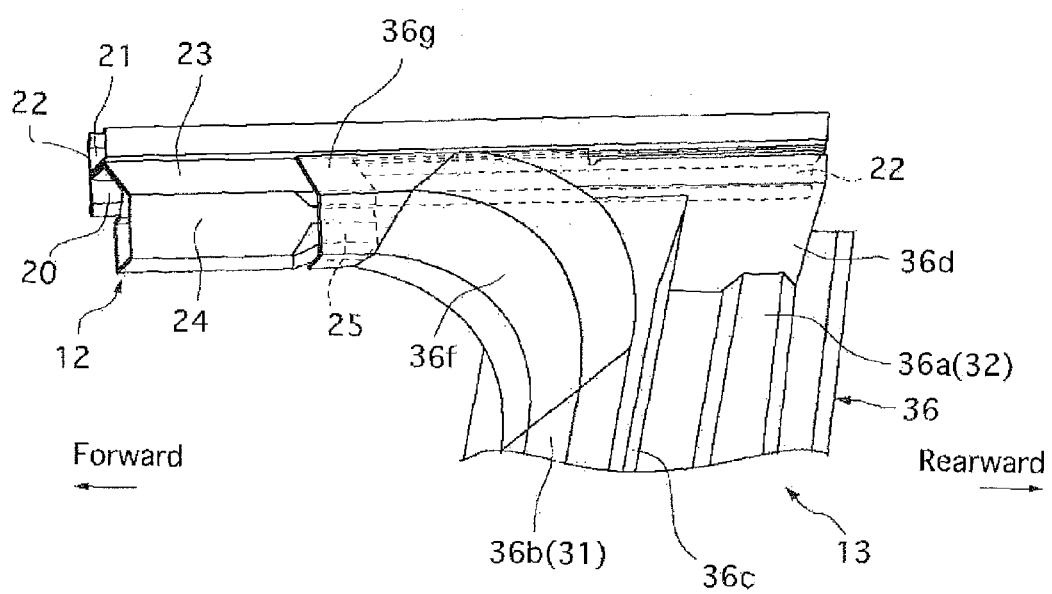
FIG. 4 is a perspective view of a portion of the vehicle door shown in FIG. 1 in the vicinity of the joint between the upper sash and the side sash, viewed from the vehicle interior side.

The structure of a joint C (see FIG. 1) between the upper sash 12 and the side sash 13 will be hereinafter discussed with reference to the drawings from FIG. 4 onwards. A portion of the upper sash 12 in the vicinity of the joint C is elongated substantially linearly in the forward/rearward direction of the vehicle. The upper sash 12 is a molded product made of metal by roll forming and basically has a uniform cross-sectional shape in the aforementioned linearly elongated portion. However, only in an end part (rear end part) of the upper sash 12, the connecting arm portion 23 and the main frame portion 24 are cut off so that only the designed portion 22, which includes the glass-run retaining part 20 and the weather strip retaining part 21, remain intact (see FIGS. 5 and 9). Namely, at the rear end part of the upper sash 12, the main frame portion 24 and the connecting arm portion 23 are formed shorter than both the designed portion 22, and the glass-run retaining part 20 and the weather strip retaining part 21 that are positioned behind the designed portion 22. This end part of the main frame portion 24 that is formed short in length is formed as a sectional-shape-reduced portion 25 which is smaller in sectional shape (sizes in the vertical direction and the direction of the thickness of the vehicle door) than a main body of the main frame portion 24 that is positioned closer to the front of the vehicle than the end part of the main frame portion 24. Specifically, the sectional shape of the sectional-shape-reduced portion 25 has been reduced by crushing a side of the main frame 24 toward the designed portion 22 by a slight amount (see FIG. 8).

Figure 5:
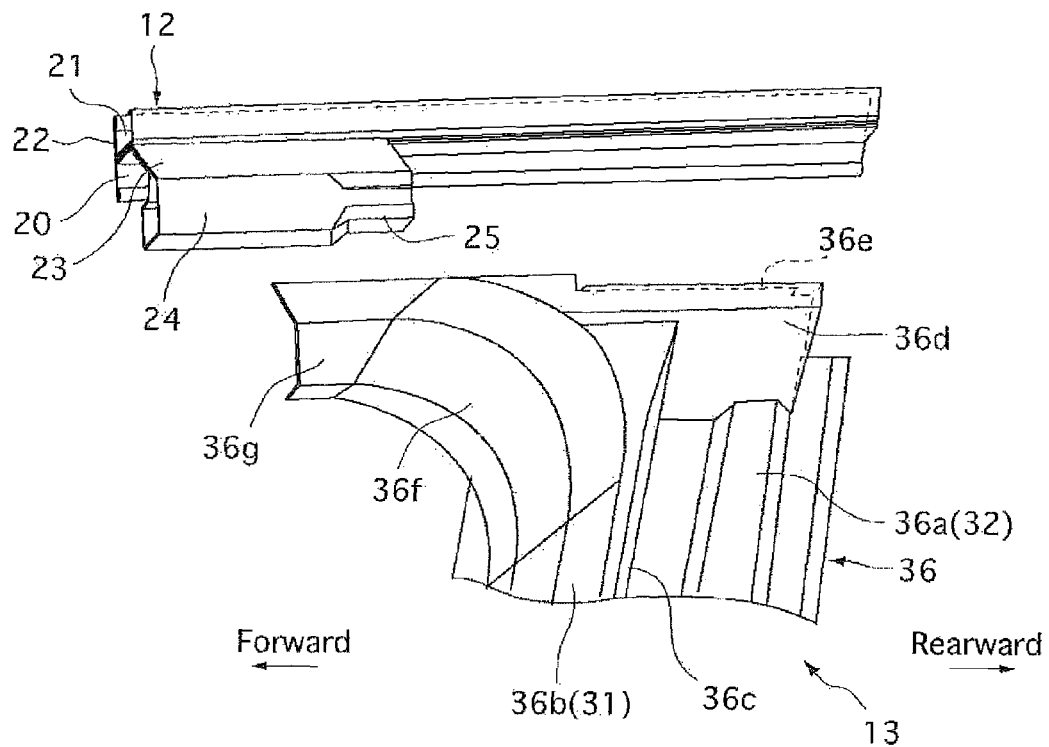
FIG. 5 is an exploded perspective view of the portion shown in FIG. 4 in the vicinity of the joint between the upper sash and the side sash.
Figure 8:
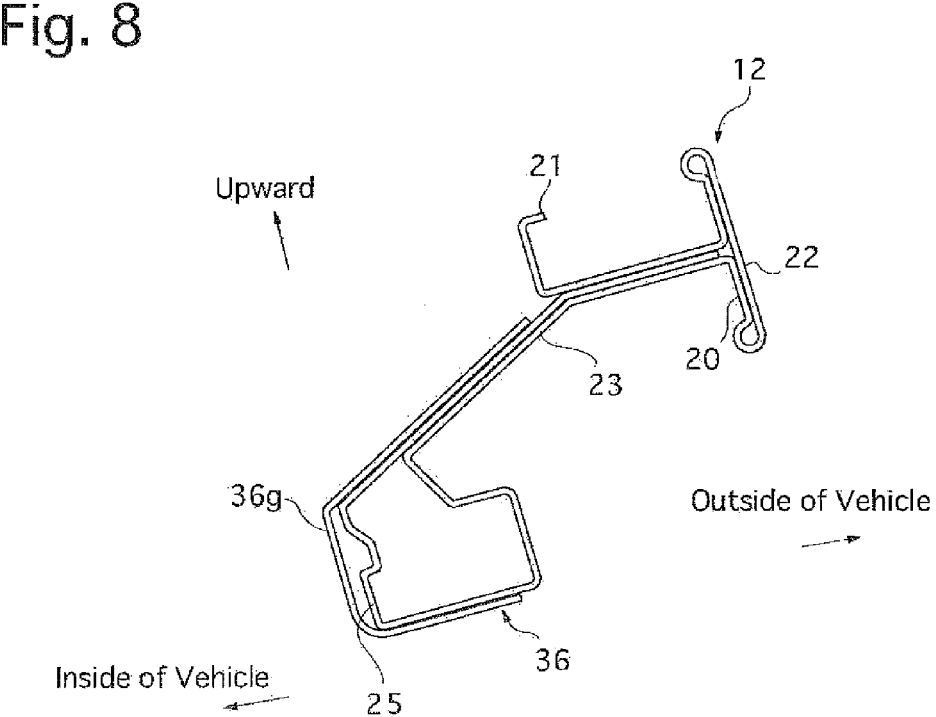
FIG. 8 is a cross sectional view taken along the line E-E shown in FIG. 6.
Figure 9:
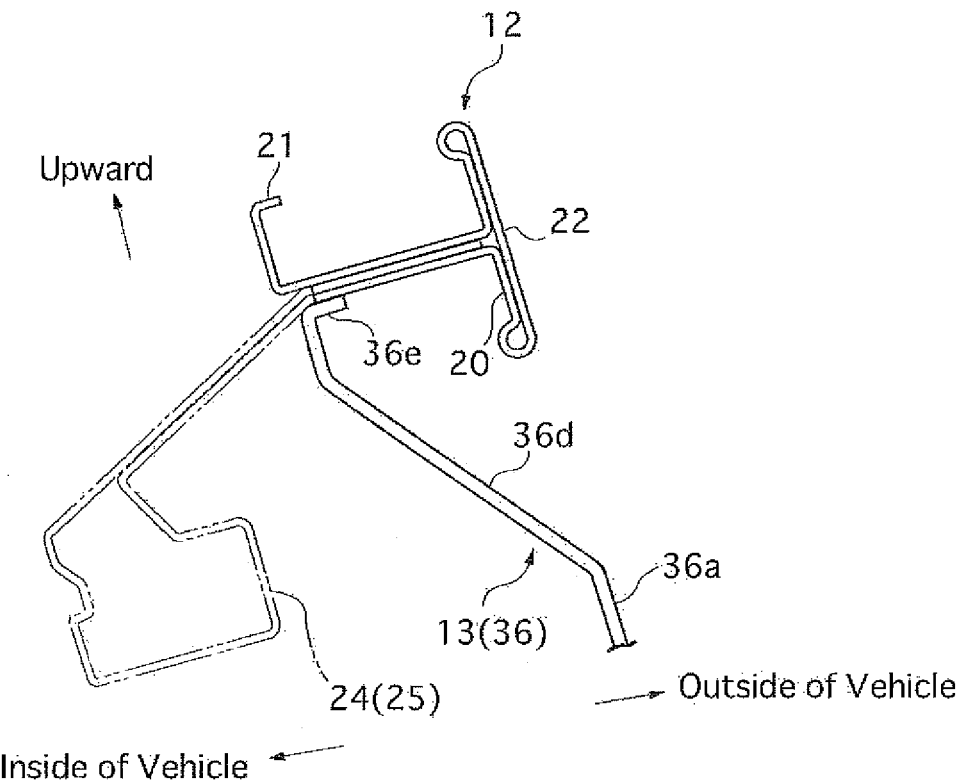
FIG. 9 is a cross sectional view taken along the line F-F shown in FIG. 6.
Figure 10:
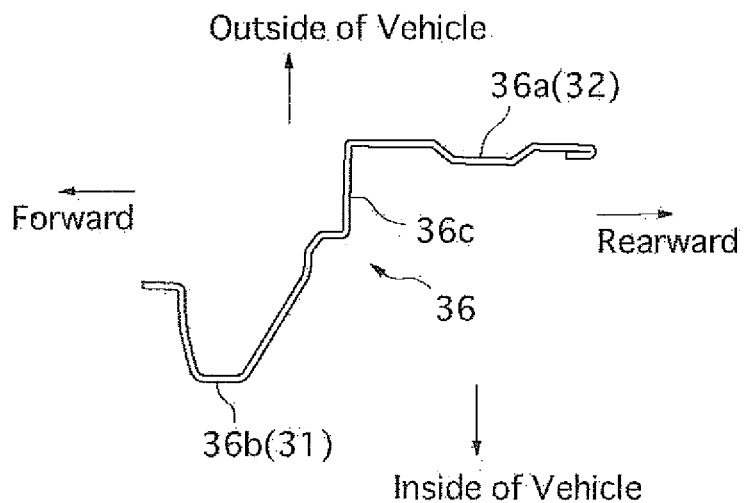
FIG. 10 is a cross sectional view taken along the line G-G shown in FIG. 6.
Figure 11:
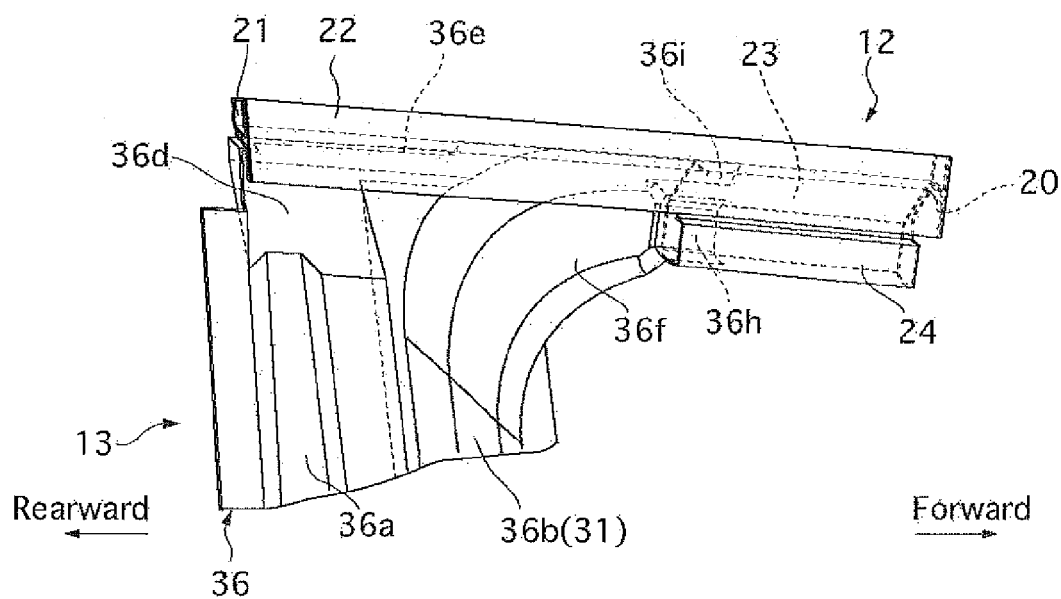
FIG. 11 is a perspective view of a portion of a vehicle door in the vicinity of the joint between an upper sash and a side sash, viewed from the vehicle exterior side, in a different embodiment of the present invention.

The upright-pillar inner member 36 of the side sash 13 is press-formed so that the width thereof gradually decreases upwardly, toward the joint C between the upper sash 12 and the side sash 13, from the downside of the upright-pillar inner member 36 that is positioned on the door panel 11 side. The upright-pillar inner member 36 is provided at the upper end thereof with an upper inclined surface portion 36$d$ which is formed to be continuous with the outer surface portion 36$a$ and to be inclined toward the inside of the vehicle while extending upwardly, and is provided at the upper end of the upper inclined surface portion 36$d$ with an upper-edge end portion 36$e$ formed by bending. The upright-pillar inner member 36 is further provided at the upper end thereof with an arc-shaped bent portion 36$f$ which is curved toward the front of the vehicle while extending upwardly. A superposed contact portion 36$g$ is formed at the end of the arc-shaped bent portion 36$f$. The superposed contact portion 36$g$ has a cup-shaped (U-shaped) cross sectional shape which is open toward the outside of the vehicle so that the inner surface of the superposed contact portion 36$g$ can be laid over the outer surfaces of the sectional-shape-reduced portion 25 and the connecting arm portion 23 as shown in FIG. 8. FIGS. 4 and 5 shows a state viewed from the outside of the vehicle, the outer surface (convex surface) of this cup-shaped superposed contact portion 36$g$ is shown. The range of formation of the upright-pillar guide member 35 along the upright-pillar inner member 36 extends only to a position below the arc-shaped bent portion 36$f$, so that the superposed contact portion 36$g$ is in an exposed state, with the opening thereof that faces toward the outside of the vehicle not being closed by the upright-pillar guide member 35. Accordingly, the superposed contact portion 36$g$ and the sectional-shape-reduced portion 25 can be superposed on each other in the direction of the thickness of the vehicle door as shown in FIG. 8.

Figure 6:
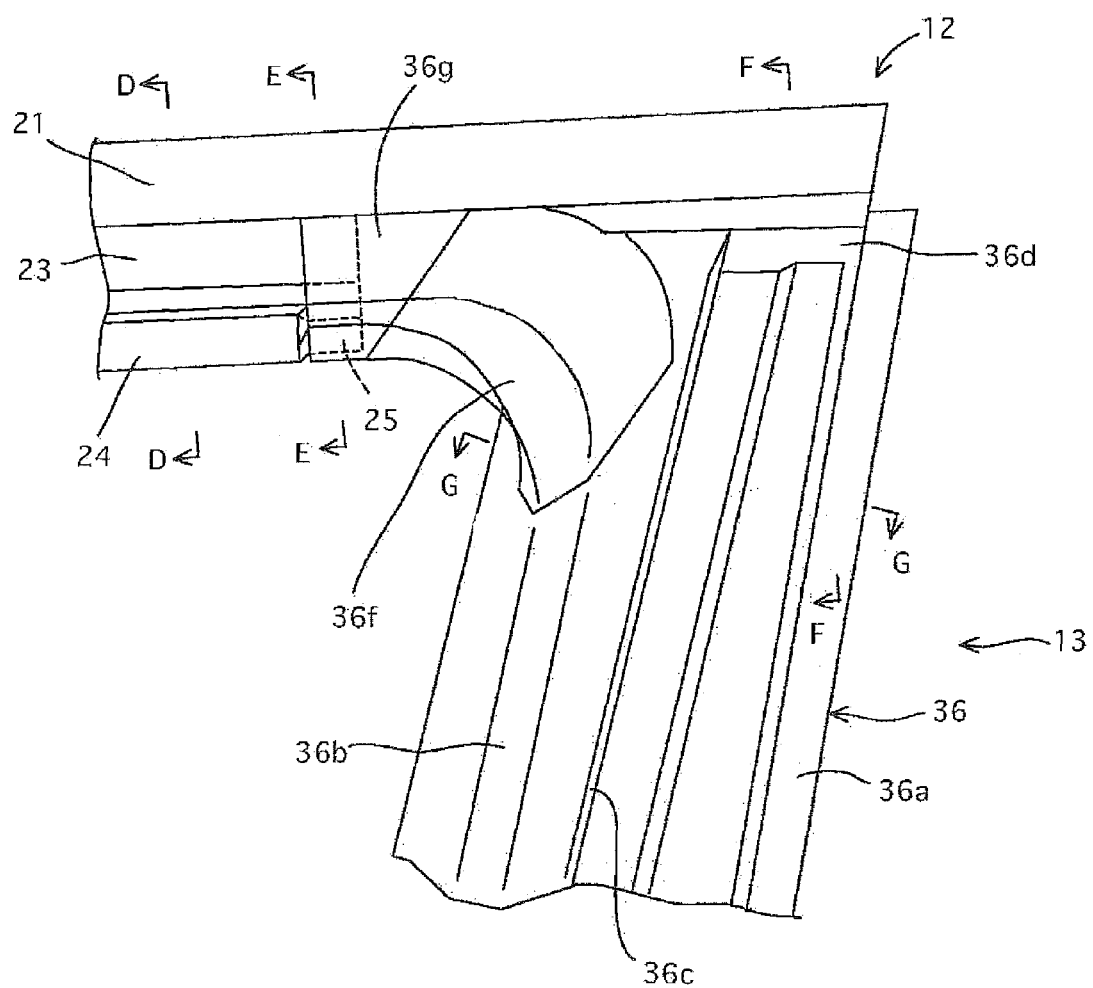
FIG. 6 is a side view of the portion in the vicinity of the joint between the upper sash and the side sash, viewed from the vehicle interior side.
Figure 7:
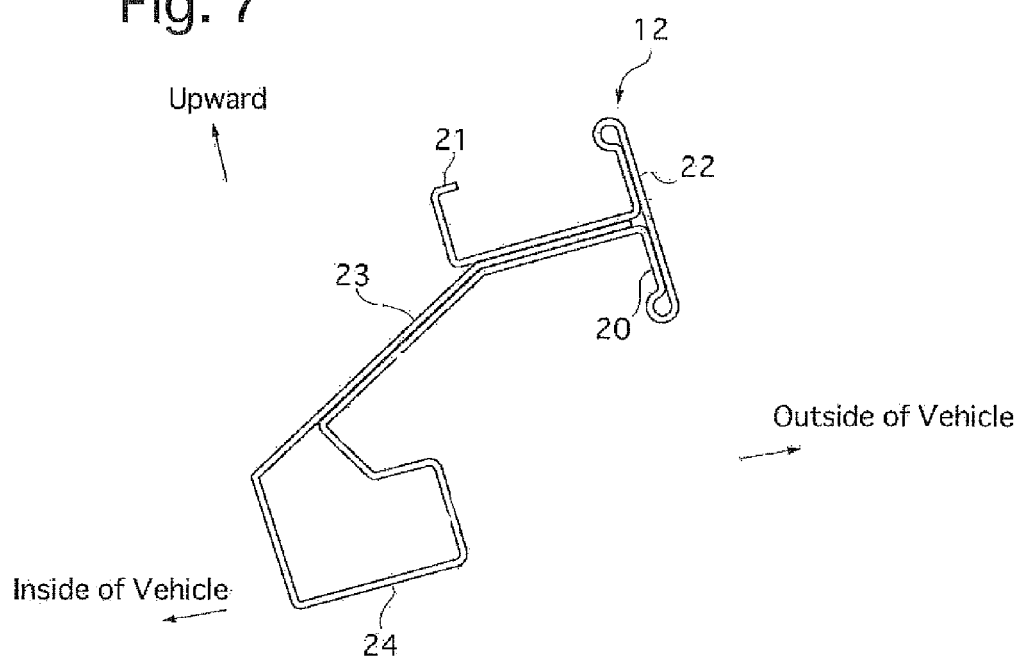
FIG. 7 is a cross sectional view taken along the line D-D shown in FIG. 6.

When joined together, the upper sash 12 and the side sash 13 are combined so that the sectional-shape-reduced portion 25 is fitted into the superposed contact portion 36$g$ as shown in FIG. 8. FIGS. 4 and 6 shows the sectional-shape-reduced portion 25 fitted into the superposed contact portion 36$g$. In this fitted state, an inner surface of the superposed contact portion 36$g$ is fitted on outer surfaces of the sectional-shape-reduced portion 25 and the connecting arm portion 23 to thereby prevent the superposed contact portion 36$g$ from deviating toward the front area of the main frame portion 24. Thereafter, the upper sash 12 and the side sash 13 are joined together by welding together the superposed portions between the sectional-shape-reduced portion 25 and the superposed contact portion 36$g$. According to this joint structure, the sectional-shape-reduced portion 25 and the superposed contact portion 36$g$ that are superposed on each other in the direction of the thickness of the door 10 constitute a joint between the upper sash 12 and the side sash 13. Accordingly, as compared with a type of joint structure in which end surfaces of an upper sash member and an upright-pillar sash member are butt-joined to each other. No strict accuracy control for this joint is necessary. The joining operation is easy, and has excellent productivity characteristics. Moreover, the joint structure is superior in strength because a large joining area can be secured.

On the vehicle rear side behind the superposed area between the sectional-shape-reduced portion 25 and the superposed contact portion 36$g$, the upper sash 12 does not interfere with the arc-shaped bent portion 36$f$ of the side sash 13 that lies on a line extended from the main frame portion 24 because the main frame portion 24 and the connecting arm portion 23 of the upper sash 12 are removed therefrom. On the other hand, there is no weld scar seen on the outer surface of the designed portion 22 between the designed portion 22 and the side sash 13 since the designed portion 22 of the upper sash 12 is continuously formed in the rear end part of the upper sash 12, in which the main frame portion 24 is cut off. The upper-edge end portion 36$e$ of the side sash 13 is formed so as to be in contact with an inner surface of the glass-run retaining part 20 at a position offset toward the inside of the vehicle away from the designed portion 22. Accordingly, a process for making welded marks inconspicuous is no longer necessary, which also contributes to an improvement in productivity.

Figure 12:
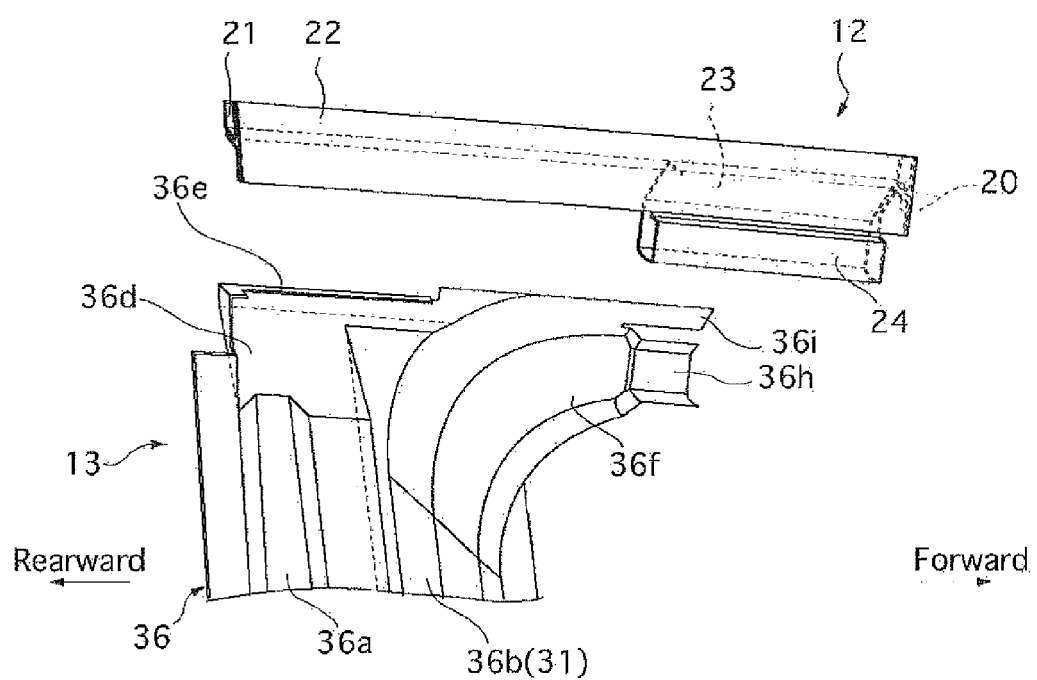
FIG. 12 is an exploded perspective view of the portion shown in FIG. 11 in the vicinity of the joint between the upper sash and the side sash, viewed from the vehicle exterior side.
Figure 13:
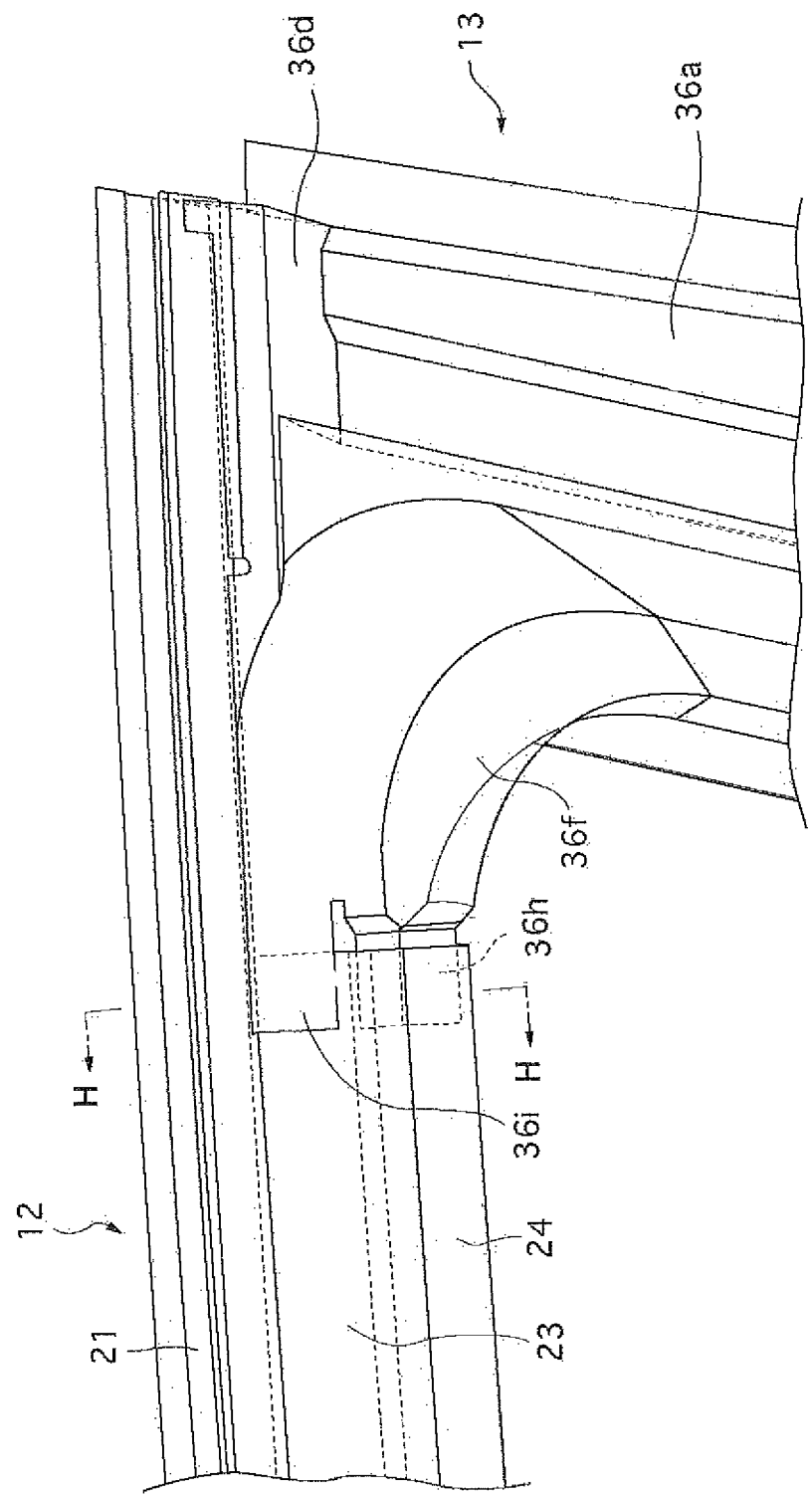
FIG. 13 is a side view of the portion shown in FIGS. 11 and 12 in the vicinity of the joint between the upper sash and the side sash, viewed from the vehicle interior side.

FIGS. 11 through 14 show a different embodiment from the first embodiment. The previous embodiment shown in FIG. 1 through 10 has a superposed relationship between the upper sash 12 and the side sash 13, in which the sectional-shape-reduced portion 25 that is smaller in sectional shape than a main body of the main frame portion 24 is formed at an end part of the main frame portion 24 of the upper sash 12 and the superposed contact portion 36$g$ of the side sash 13 covers an outer surface of the sectional-shape-reduced portion 25. In contrast to this, in the present embodiment, no process for reducing cross-sectional size is performed on the end part of the main frame portion 24 of the upper sash 12. Instead, a superposed contact insertion portion 36$h$ which is smaller in cross sectional shape than the superposed contact portion 36$g$ of the previous embodiment is formed at an end of the arc-shaped bent portion 36$f$. More specifically, the superposed contact insertion portion 36$h$ is inserted into the inside of the main frame portion 24 that has a polygonal-tubular hollow sectional shape, and is formed to have a shrunken shape in cross section so that the outer surface of the superposed contact insertion portion 36$h$ contacts an inner surface of the main frame portion 24. The superposed contact insertion portion 36$h$ has a U-shaped cross sectional shape which is open toward the outside of the vehicle, and the inner surface (concave surface) of this U-shaped superposed contact insertion portion 36$h$ is shown in FIG. 12 (and FIG. 11) that illustrates a view from the outside of the vehicle. Aside from the superposed contact insertion portion 36$h$, the arc-shaped bent portion 36$f$ is further provided at the end portion thereof with an extension retaining portion 36$i$ which is formed to extend straight forward with no stepped portion given to the arc-shaped bent portion 36$f$.

Figure 14:
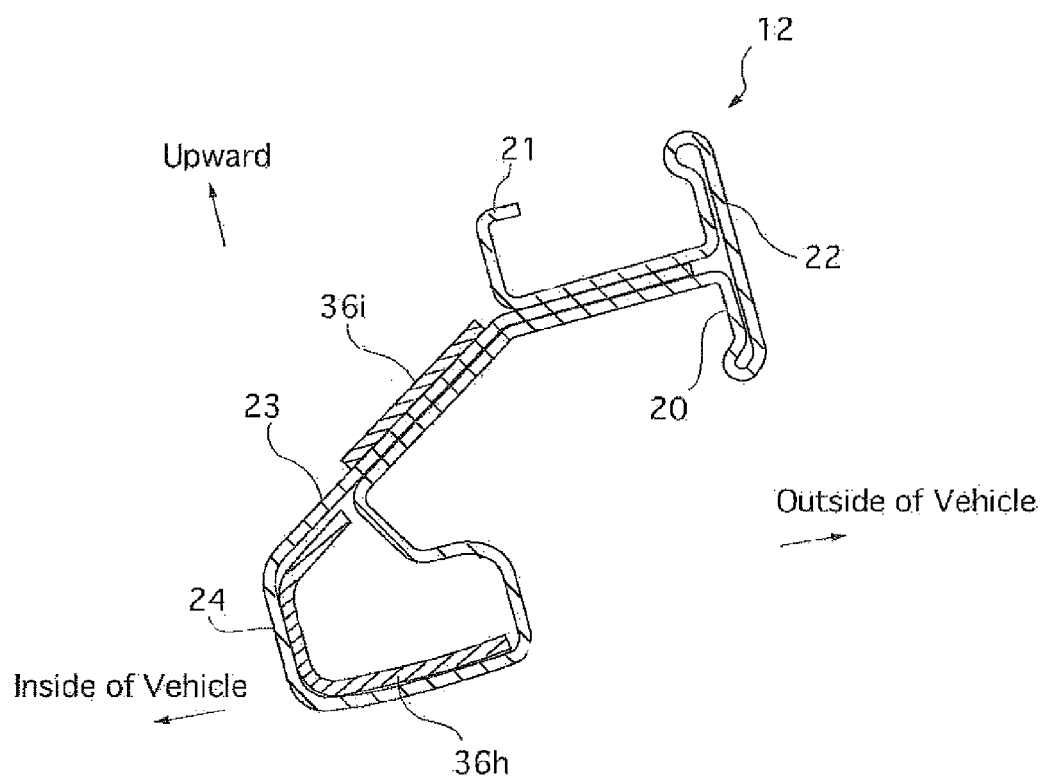
FIG. 14 is a cross sectional view taken along the line H-H shown in FIG. 13.

When the upper sash 12 and the side sash 13 are combined, the superposed contact insertion portion 36$h$ of the side sash 13 is inserted inside the hollow main frame portion 24, which causes the outer surface of the superposed contact insertion portion 36$h$ and an inner surface of the main frame portion 24 to be overlaid on each other as shown in FIG. 14. Simultaneously, the extension retaining portion 36*i* is not inserted into the main frame portion 24, but is placed on an outer surface (surface on the inside of the vehicle) of the connecting arm portion 23 of the upper sash 12. Namely, the main frame portion 36*h* and the extension retaining portion 36*i* sandwich the main frame portion 24 and the connecting arm portion 23 from inside and outside, respectively. Thereupon, the superposed contact portions of these elements are fixed together by welding, or the like, to combine the upper sash 12 and the side sash 13. In this construction, no strict accuracy control for the joint is necessary while productivity is excellent since each of the main frame portion 36*h* and the extension retaining portion 36*i* is overlaid on the main frame portion 24 in the direction of the thickness of the door. Moreover, the large joining area makes it advantageous to secure strength.

As described above, the door frame structure according to the present invention makes it possible to join the upper sash 12 and the side sash 13 to each other easily and securely and obtain high productivity. However, the present invention is not limited to the above illustrated embodiments, and modifications and variations of the invention can be made without departing from the spirit and scope of the invention. For instance, in the above illustrated embodiments, the arc-shaped bent portion 36*f* is formed to be continuous with the upper end of the inwardly projecting portion 36*b* in the upright-pillar inner member 36, and the end of the arc-shaped bent portion 36*f* is formed as the superposed contact portion 36*g*, or the superposed contact insertion portion 36*h* (and the extension retaining portion 36*i*), which is a portion to be joined to the upper sash 12. Although this structure has the merit of the door frame being able to be manufactured in a relatively easy manner with no need to increase the number of elements, a joint corresponding to the superposed contact insertion portion 36*h*, or the superposed contact insertion portion 36*h* and the extension retaining portion 36*i*, can be formed with no involvement of a bent portion such as the arc-shaped bent portion 36*f*.

Figure 15:
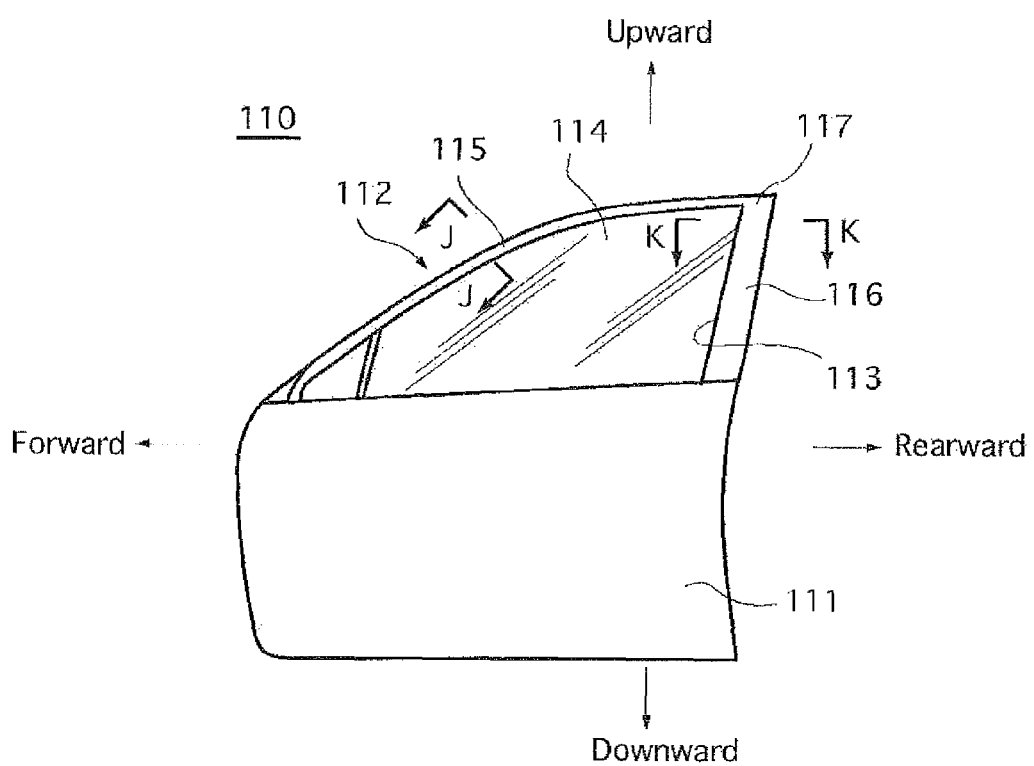
FIG. 15 is a side elevation view of the vehicle door where the doorframe structure of this invention is applied.
Figure 24:
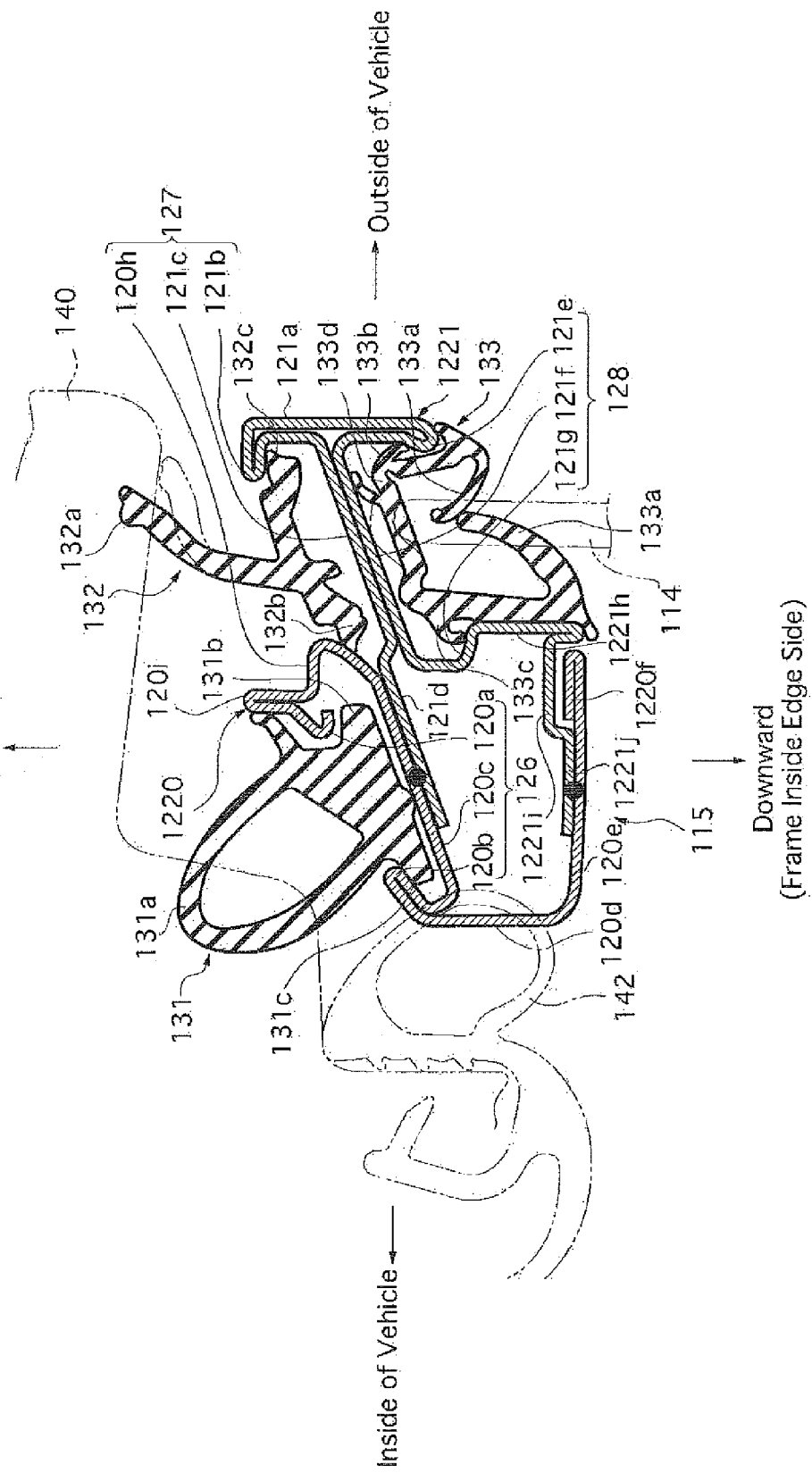
FIG. 24 is a cross section view of upper sashes where the embodiment with different further doorframe structure of this invention is shown.

FIG. 24 shows the second embodiment of the doorframe structure of the vehicle from FIG. 15.

The side door 110 of the automobile shown in FIG. 15, along with the doorframe 112 is formed to framework condition to top of door panel 111. Window glass 114 goes up and down inside window 113 of door panel 111 and surrounded by doorframe 112. Doorframe 112 and roof panel 140 of the vehicle body run parallel to the door open part. The upper sash section from the rear section of the 115 and the door panel 111 are parallel to the center pillar 141 of the vehicle body. The side sash section (column setting up sash section) extends to top and bottom directions. Furthermore, door 110 is the door for the front seat. In addition, the frame inner edge is the edge of the window 113 in doorframe 112. In upper sash section 115, the lower part is meant in general. In side sash section 116, the front is meant in general. In upper sash section 115, the upper part is meant in the same way in general. In side sash section 116, the rear is meant in general.

Figure 17:
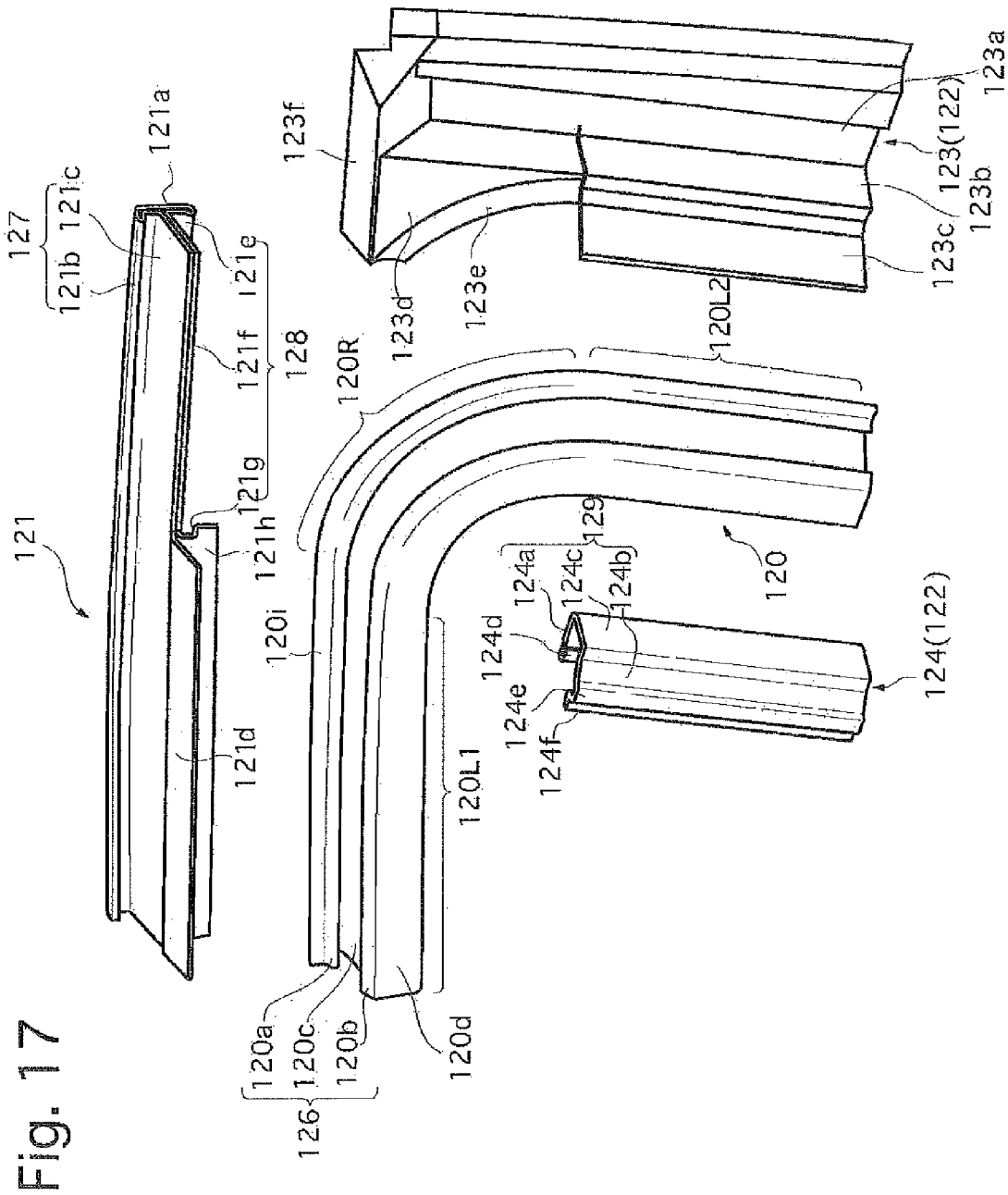
FIG. 17 is an exploded perspective view seen from the inside of the car in the vicinity of the same boundary part.
Figure 18:
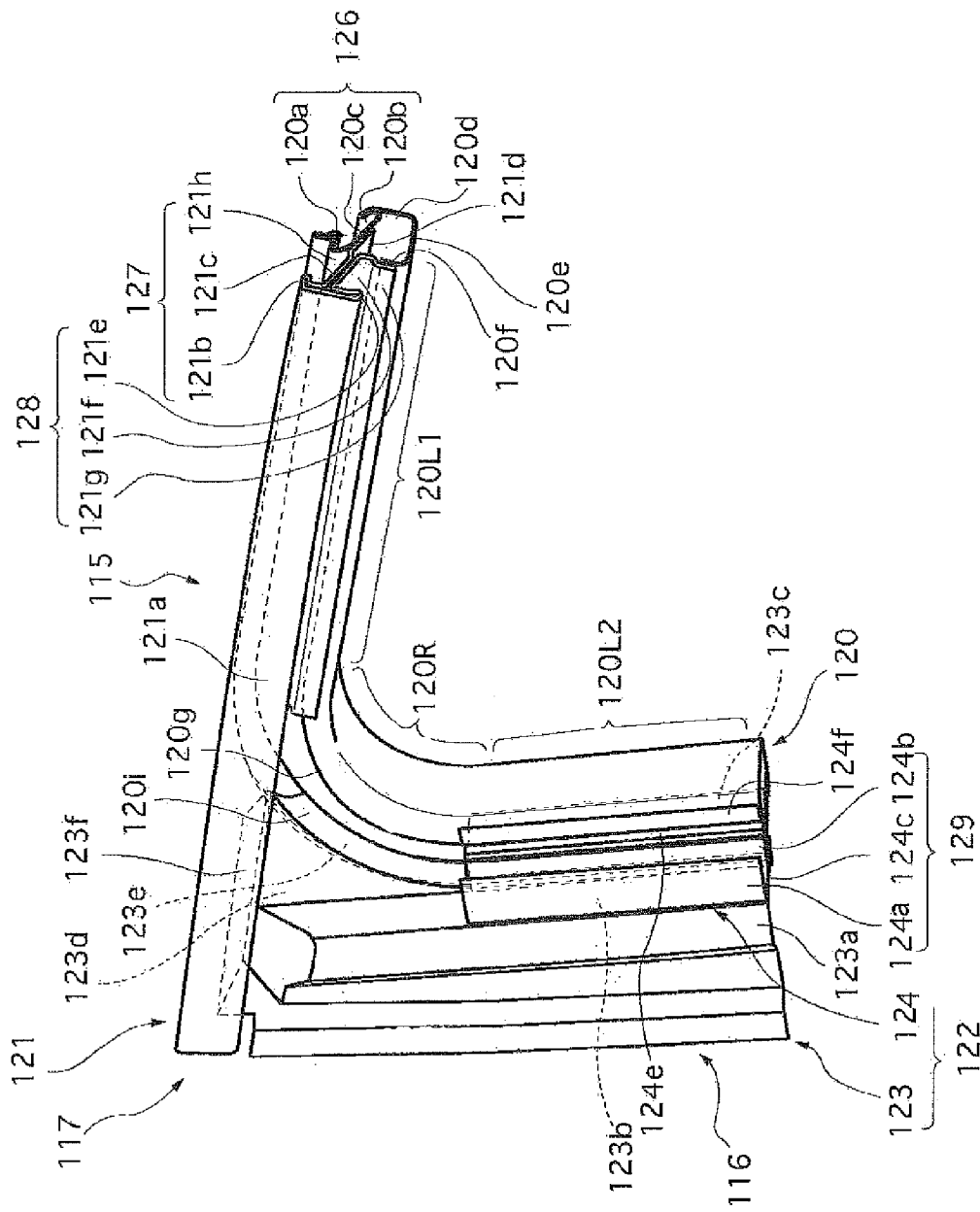
FIG. 18 is an oblique perspective view of the vicinity of the same boundary part from the outside of the car.
Figure 19:
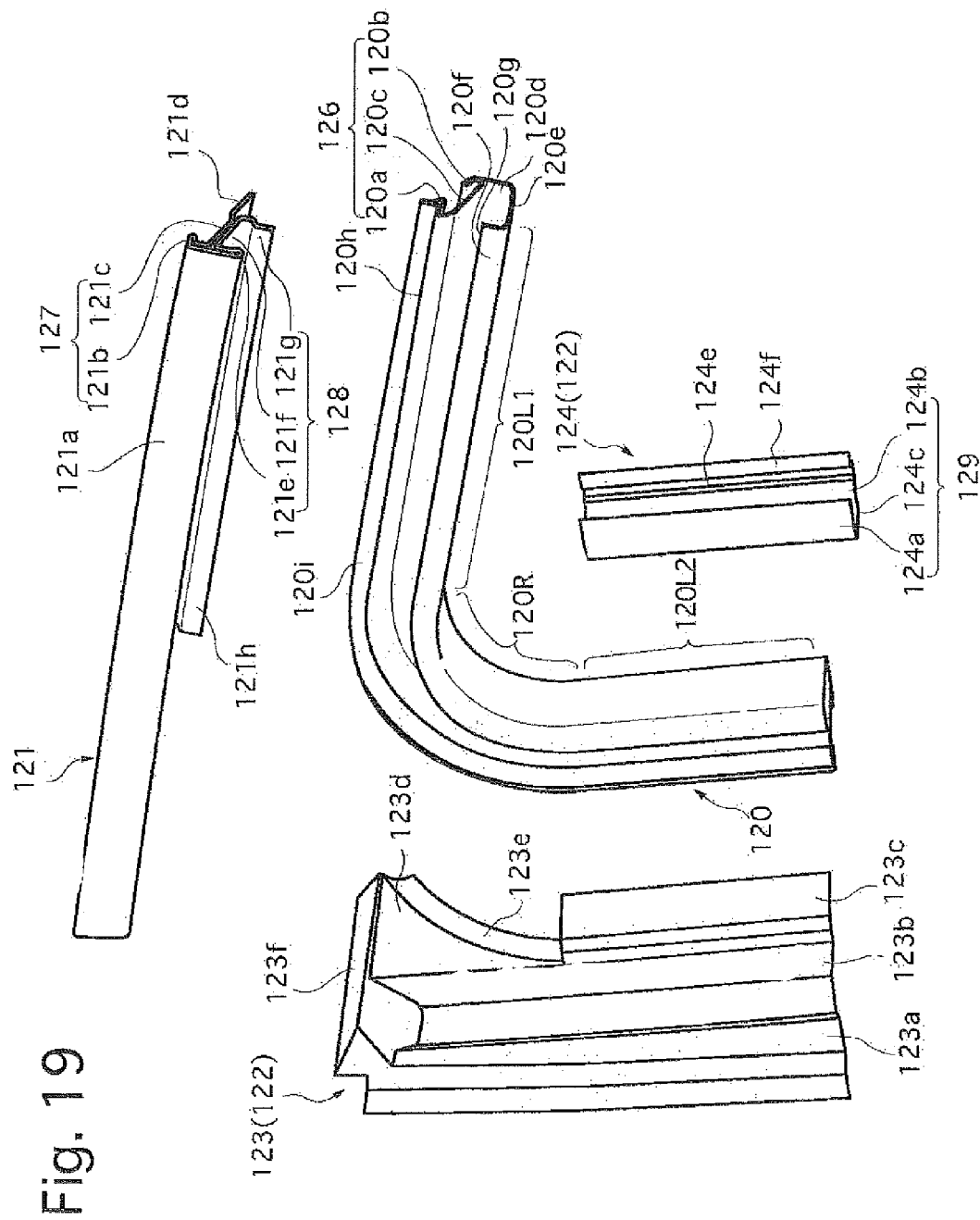
FIG. 19 is an exploded perspective view seen from the outside of the car in the vicinity of the same boundary part.

Doorframe 112 is formed as a seamless frame component (interior side frame component). FIG. 17 and FIG. 19 shows frame component 120 and upper side design component 121 and column setting up side design component 122. Upper side design component 121 forms the design section which as a single unit is located on external side of upper sash section 115. Column setting up side design component 122, column setting up main component 123 and column setting up sub component 124, being combined, form the design section which is located on external side of side sash section 116. The design section is located on these external sides as for seamless frame component 120. Upper sash section extends to the both of 15 and side sash section 116 without breaking off in the door corner section 117 (FIG. 15) in the top of side sash section 116. It forms the interior side frame section of doorframe 112.

Figure 20:
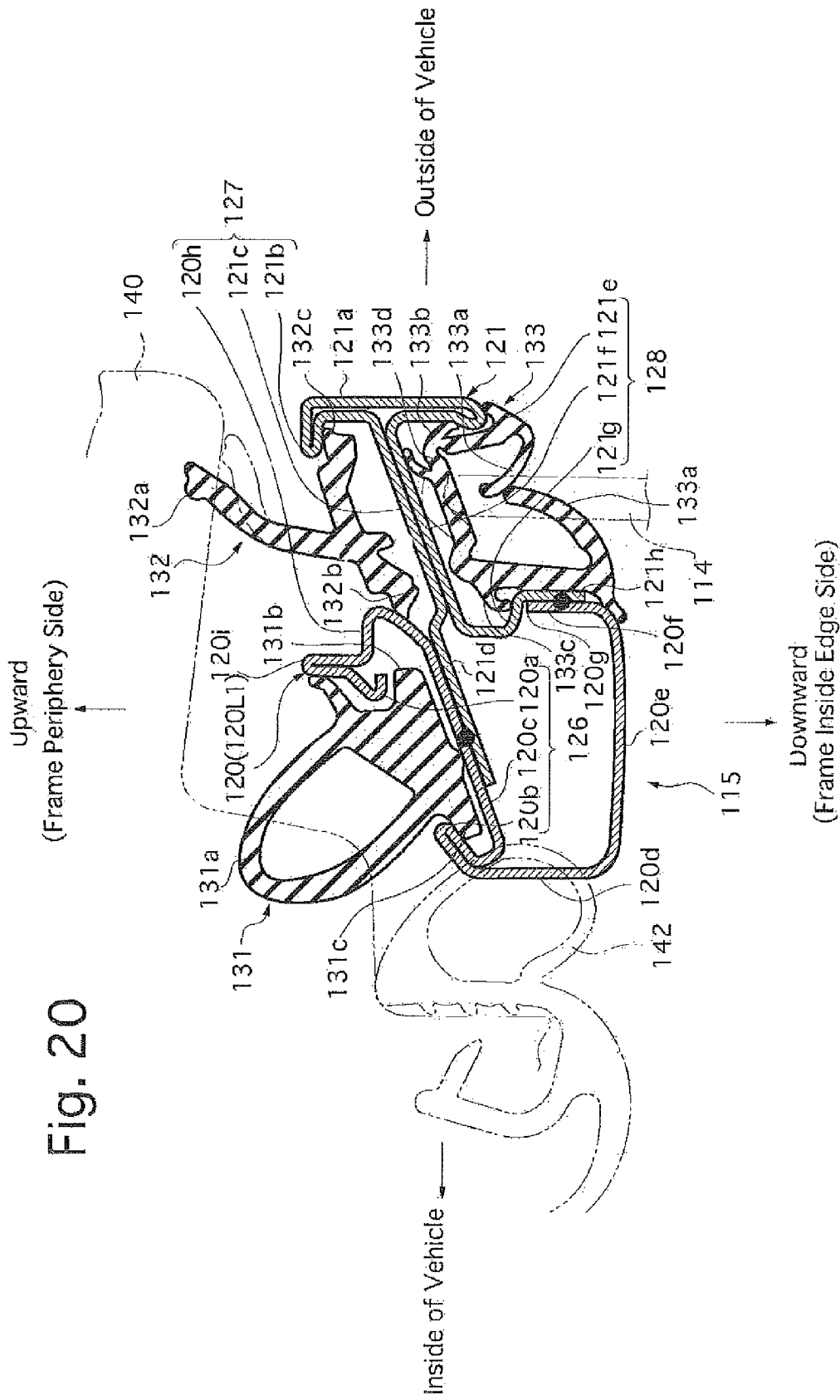
FIG. 20 is a cross section view of upper sashes along J-J line of FIG. 15.
Figure 21:
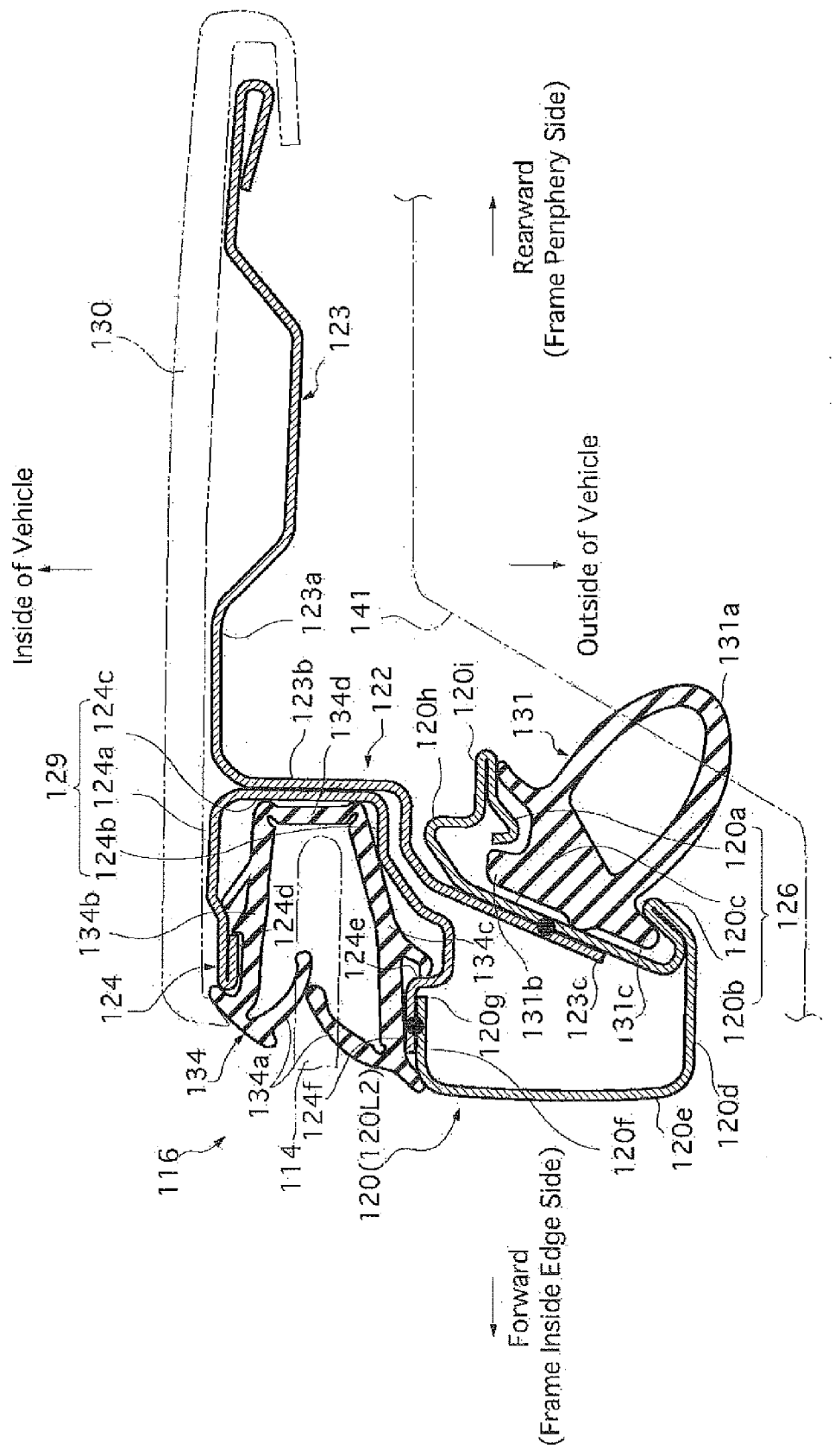
FIG. 21 is a cross section view of the side sash along K-K line of FIG. 15.

As shown in FIG. 20 and FIG. 21, seamless frame component 120 possesses the bottom surface 120*c* which connects hook section 120*a*, 120*b* and said hook section 120*a* and 120*b*. Retention groove 126 which is opened is formed. In addition, seamless frame component 120 includes bottom side of the strip retention groove 126, bottom surface 120*c*, interior side wall section 120*d*, and inner edge wall 120*e*. Returning wall 120*f* at the same time possesses frame open part 120*g* between the returning wall 120*f* and bottom surface. Bottom surface 120*c* forms imperfect tubular (box condition) section. In detail, directing to the edge direction inside the frame from hook section 120*b*, interior side wall section 120*d* extends facilities from the edge of the said interior side wall section 120*d* and directs to external side and inner edge wall 120*e*. From the edge of the inner edge wall 120*e*, frame periphery direction of plane returning wall 120*f* is bent and formed. As for the edge of the time returning wall 120*f*, frame open part 120*g* is formed without connecting to the other part of seamless frame component 120. In addition, seamless frame component 120 is located between removal stopping step section 120*h* and the removal stopping step section 120*h* and the hook section 120*a*, which are located on rear side (external side) of hook section 120*a*. It is extended to frame periphery side returning sudden section 120*i*.

In FIG. 20, upper side design component 121 is directed from the top of design surface 121*a* of the flange, which is located on the external side and the design surface 121*a* to interior side. The bottom surface 121*c* of the plane follows to hook section 121*b*. Bottom surface 121*c* directs from the bottom of fixed fin (being superimposed fixed surface) 121*d* of the plane, which on interior side extends out. Removal stopping step section 121*e* follows to the bottom surface 121*f* of the plane which follows to section 121*e*. The bottom surface 121*f* is formed and opposes removal stopping step section 121*e*. Removal stopping step section 121*g* and the removal stopping step section 121*g* are located with the fixed fin (being superimposed fixed surface) 121*h* to edge direction inside the frame. Removal stopping step section 121*e*, bottom surface 121*f* and removal stopping step section 121*g* and fixed fin 121*h* direct to the edge side inside the frame. The glass run retention groove 128 is formed. In addition, hook section 121*b* and bottom surface 121*c* form the outer weather-strip retention groove 127. Stopping step section 120*h* of seamless frame component 120 opposes hook section 121*b* combining upper side design component 121 with seamless frame component 120 to complete the outer weather-strip retention groove 127.

As shown in FIG. 21, the column setting up main component 123 which forms column setting up side design component 122 directing from design surface 123*a* and the design surface 123*a* which face to external side to interior side, as it advances to interior side from connected wall 123*b* and the connected wall 123*b* which extending facilities are done, in order to approach to the edge side inside the frame, has had the fixed fin (being superimposed fixed surface) 123*c* of the plane which inclines. Column setting up sub component 124 is opposite to design surface 124*a* and the design surface 124*a* which has formed the cross section of the bottom surface 124*c* which connects interior side wall section 124*b* and the design surface 124*a* and the interior side wall section 124*b* which are located on interior side. The area is surrounded in these design surfaces 124*a*, interior side wall section 124*b* and bottom surface 124*c*, and forms the glass run retention groove 129 which is opened on edge side inside the frame. Respective removal stopping step section 124*d* and 124*e* are formed by the opposition surface of design surface 124*a* and interior side wall section 124*b*. Fixed fin (being superimposed fixed surface) 124*f* of plane is formed to the end of edge side inside the frame which follows to removal stopping step section 124*e* in interior side wall section 124*b*. When column setting up main component 23 and column setting up sub component 124 is locked, connected wall 123*b* and bottom surface 124*c* becomes the column setting up side design component 122. When doorframe 112 has been completed, the garnish 130 becomes the appearance component to cover the external side of design surface 123*a* and design surface 124*a*, (in FIG. 21 showing with the virtual line,) in column setting up side design component 122.

Upper sash section 115 is formed combining upper side design component 121 with seamless frame component 120. FIG. 20 shows fixed fin 121*d* to the underside side of bottom surface 120*c*, fixed fin 121*h* to the external side of the returning wall 120*f*. Superimposed surface parts and upper side design component 121 is combined with seamless frame component 120. It is desirable to use laser welding, as a fixed technique of the superimposed aspect which is continued in longitudinal direction of this kind of sash. When upper side design component 121 is combined with seamless frame component 120, frame open part 120*g* is filled by the portion of upper side design component 121, bottom surface 120*c*, interior side wall section 120*d*, and inner edge wall 120*e*. Interior side frame section of the upper sash section 115 forms the hollow section in the tube shape which is surrounded by returning wall 120*f*. Fixed fin 121*d*, removal stopping step section 121*g* and by 2nd fixed fin 121*h* are completed. Upper side design component 121 is combined with seamless frame component 120 removal stopping step section 120*h* is opposite to hook section 121*b*. The outer weather-strip retention groove 127 is formed.

Side sash section 116 is formed by seamless frame component combining 120 and column setting up side design component 122. As shown in FIG. 21, fixed fin 123*c* to the underside side of bottom surface 120*c*, fixed fin 124*f* is repeated to the external side of the time returning wall 120*f* lock. Superimposed surface parts and seamless frame component 120 and column setting up side design component 122 are combined. Seamless frame component same as the fixing of 120 and upper side design component 121, seamless frame component it is desirable to use laser welding for also fixing of 120 and column setting up side design component 122. Seamless frame component when 120 and column setting up side design component 122 is combined, frame open part 120*g* is filled by the portion of column setting up side design component 122, bottom surface 120*c*, interior side wall section 120*d*, inner edge wall 120*e*, the interior side frame section of the side sash section 116 which forms the hollow section in the tube shape which is surrounded returning wall 120*f*, fixed fin 123*c*, by removal stopping step section 124*e* and fixed fin 124*f* is completed.

Figure 16:
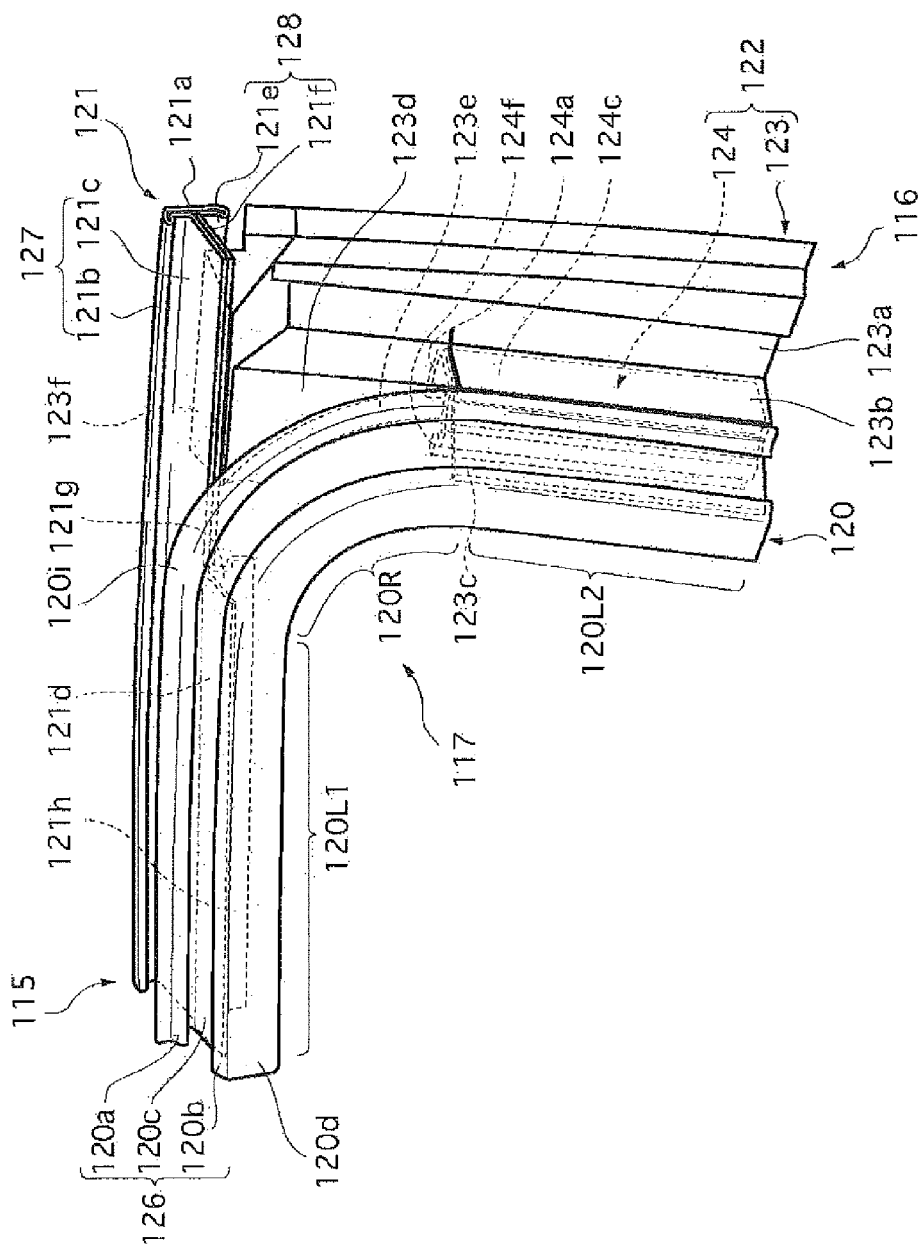
FIG. 16 is an oblique perspective view of the vicinity of the boundary part of upper sashes and the side sash in the vehicle door in FIG. 15 from the inside of the car.

Seamless frame component 120, upper side design component 121 and column setting up side design component 122 reaches upper sash section 115 and side sash section 116. Door corner section 117 is designed to be the structure which differs somewhat. As shown in FIG. 16 or FIG. 19, seamless frame component 120 has upper side frame section 120L1 and the column setting up side frame section 120L2, which parallels to the respective longitudinal direction of 121 and column setting up side design component 122 in near door corner section 117. Corner bend 120R of circular arc condition is located between upper side frame sections 120L1 and column setting up side frame section 120L2. As for the inner weather-strip retention groove 126, it is formed on corner bend 120R.

Upper side design component 121 parallel to the upper side frame section 120L1 of seamless frame component 120. Upper side design component 121 has an even cross section. The 1st fixed fin 121*d* relates to the fixing to seamless frame component 120. The start part of corner bend 120R of seamless frame component 120 relates to the end mount (rear end). Removal stopping step section 121*g* and 2nd fixed fin 121*h* are excised, Design surface 121*a*, removal stopping step section 121*g*, bottom surface 121*c*, hook section 121*b*, removal stopping step section 121*e* and bottom surface 121*f* are left and extending facilities are done to upper part position of column setting up side design component 122. Regarding column setting up side design component 122, fixed fin 123*c* of column setting up main component 123 couples to the top of column setting up side design component 122. The start part of corner bend 120R of seamless frame component 120 is with the lower part. The part which excludes the fixed fin 123*c* in column setting up main component 123 extending facilities is done to the top of column setting up side design component 122. In addition the top of column setting up sub component 124 has broken off at fixed fin 123*c*. Namely, upper side design component 121 and each column setting upside design component 122 superimposed on fixed surface part of upper side frame section 120L1 of seamless frame component 120 and column setting up side frame section 120L2, in the formation area of corner bend 120R. It has become possible to provide corner bend 120R in seamless frame component 120, each one the upper side design component without causing the interference of upper side design component 121 which is formed to abbreviation rectilinear condition and column setting up side design component 122.

Top position of the fixed fin 123*c* (with column setting up sub component 124) in column setting up main component 123 compared to, corner bend 120R of seamless frame component 120. The cover 123*d* closes between columns setting up side design component 122 without the opening formed on top. Corner bend 120R has the curve surface 123*e* which parallels to returning sudden section 120*i*, as shown in FIG. 16, when column setting up side design component 122 is made to join the seamless frame component 120. Curve surface 123*e* corner bend 120R is piled up to returning sudden section 120*i*.

Furthermore, above cover 123*d*, bottom surface 121*f* of upper side design component 121 and the top back face 123*f* are formed in column setting up main component 123. As for upper side design component 121, the 1st fixed fin 121*d* and the excision part of 2nd fixed fin 121*h*, extending facilities is done to the position with top back face 123*f*. Bottom surface 121*f* is locked to the top back face 123*f*. As for the structure which locks this kind of superimposed surface part, precision management being easy, it is possible to do fixed job simply. In addition it can take the area where it contacts widely to guarantee also the strength of the connecting part.

As shown in FIG. 20 and FIG. 21, the doorframe 112 of formed seamless frame component 120 and upper side design component combining 121 and column setting up side design component 122, inner side weather-strip 131, outer side weather-strip 132 and glass run 133 and 134 can be installed.

Inner side weather strip 131 has hollow condition seal section 131*a* and fit leg sections 131*b* and 131*c*. It is kept inside inner weather-strip retention groove 126 by fit leg section 131*b* and fit leg section engage 131*c* to, respectively, the hook section 120*a* of seamless frame component 120 and hook section 120*b*. From upper sash section 115, the inner weather-strip retention groove 126 which was formed on seamless frame component 120, in side sash section 116 without breaking off in door corner section 117, in this inner weather-strip retention groove 126 roundly also inner side weather-strip 131, in upper sash section extending 115 and side sash section 116, with uniform section distribution facilities. The weather-strip 131, has hollow condition seal section 131a and fit leg sections 131b and 131c. It is kept inside inner weather-strip retention groove 126 by making fit leg section 131b and fit leg section engage 131c respectively to the hook section 120a of seamless frame component 120 and hook section 120b. From upper sash section 115 the inner weather-strip retention groove 126 is formed on seamless frame component 120, in side sash section 116 without breaking off in door corner section 117, in this inner weather-strip retention groove 126 roundly also inner side weather-strip 131, in upper sash section extending 115 and side sash section 116, with uniform section distribution facilities.

Unlike inner side weather-strip 131, outer side weather-strip 132 is provided only in upper sash section 115. Outer side weather-strip 132, has lip section 132a and fit leg sections 132b and 132c. It is kept inside outer weather-strip retention groove 127 by making fit leg section 132b and fit leg section engage 132c respectively removal stopping step section 120h of seamless frame component 120 the bottom surface 121c of upper side design component 121.

Inner side weather-strip 131 and outer side weather-strip 132 are formed with elastic deformation rubber material. When door 110 is closed, hollow condition seal section 131a of inner side weather-strip 131 becomes deformed in roof panel touching 140 of the vehicle body (FIG. 20) and center pillar 141 (FIG. 21). Elasticity, lip section 132a of outer side weather-strip 132 becomes deformed, touching to roof panel 140. Elasticity prevents the penetration of the water-drop to interior side. Furthermore body side seal component 142 (in FIG. 20 showing in two dot chain lines,) is provided in the vehicle body. When closing door 110, the hollow seal section of this body side seal component 142 touches to the interior side wall section 120d of seamless frame component 120. Penetration of the water-drop to interior side is prevented with body side seal component 142.

Glass run 133 has the bottom 133d which is located between fit leg section 133b of lip section 133a and fit leg sections 133b and 133c. The pair which forms opposite 133c opposes bottom 133d to bottom surface 121f and is kept inside glass run retention groove 128 of upper side design component 121. Removal stopping step section 121e of the glass run retention groove 128 and removal stopping step section 121g regulate the movement of fit leg section 133b to inside the respective frame and fit leg section 133c. Falling off of glass run 133 from of the glass run retention groove 128 is regulated. Glass run 134 has the bottom 134d is located between fit leg section 134b of lip section 134a and fit leg sections 134b and 134c. Said pair which form opposite and 134c opposes bottom 134d to connected wall 123b and is kept inside glass run retention groove 129 of column setting up sub component 124. Removal stopping step section 124d of the glass run retention groove 129 and removal stopping step section 124e respectively regulate the movement of fit leg section 134b to inside the frame and fit leg section 134c. Falling off of glass run 134 from of the glass run retention groove 129 is regulated. Glass run 133 and 134 is formed with the elastic deformation possible rubber material, and the lip section 133a, 134a and bottom 133d and 134d receiving the contact of window glass 114 according to the advance (rise) quantity of window glass 114 to inside window 113, elasticity becomes deformed.

The 1st fixed fin 121d is coupled to the underside side of bottom surface 120c regarding upper sash section 115. The 2nd fixed fin 121h is coupled to the external side of the time returning wall 120f. Lock these superimposed surface parts with a technique such as laser welding. Upper side design component 121 is combined with seamless frame component 120. Among these superimposed fixed portions, bottom surface 120c and 1st fixed fin 121d forms the base section of the inner weather-strip retention groove 126. Incompletion state of the doorframe, the particular base part (bottom surface 120c and 1st fixed fin 121d) is covered by inner side weather-strip 131. In addition, 2nd fixed fin 121h and the time returning wall 120f forms the side wall section of the glass run retention groove 128. In completion state of the doorframe, the particular side wall part (2nd fixed fin 121h and time returning wall 120f) is covered by glass run 133. Namely, the seamless frame component the fixed portion of 120 in upper sash section 115 and upper side design component 121 is covered by inner side weather-strip 131 and glass run 133. Because of this, the disclosed embodiments can guarantee also sufficient waterproof characteristic.

Side sash section 116 is designed to be similar in structure. The fixed fin 123c goes to the underside side of bottom surface 120c regarding side sash section 116. Fixed fin 124f goes to the external side of the time returning wall 120f. Lock these superimposed surface parts with a technique such as laser welding. Seamless frame component 120 and column setting up side design component 122 is combined. Among these superimposed fixed portions, bottom surface 120c and fixed fin 123c form the base section of the inner weather-strip retention groove 126 in completion state of the doorframe. The particular base parts (bottom surface 120c and fixed fin 123c) are covered by inner side weather-strip 131. In addition, fixed fin 124f and the time returning wall 120f forms the side wall section of the glass run retention groove 129 in completion state of the doorframe. The particular side wall part (fixed fin 124f and time returning wall 120f) is covered by glass run 134. Namely, the seamless frame component the fixed portion of 120 in side sash section 116 and column setting up side design component 122 is covered by inner side weather-strip 131 and glass run 134. Because of this, disclosed embodiments can guarantee also sufficient waterproof characteristic.

Like above, doorframe structure is located on external side and the frame section is located on interior side as another component forms doorframe 112. Upper side design component designates the column setting up side design component 122 of 121 of upper sash section 115 and column setting up sash section 116 as another component concerning the external side design section. Upper sash section extends to the both 115 and column setting up sash section 116 concerning the interior side frame section. Because of this, regarding the interior side frame section (seamless frame component 120), upper sash section the boundary part of 115 and column setting up sash section 116 welding connecting becomes unnecessary; it is possible to improve productivity. Fixed fin 121d of the plane, 121h, 123c and 124f similarly bottom surface 120c of plane and being superimposed to returning wall 120f, because it is the structure which locks. Precision management being easy in longitudinal direction of the respective sash section the upper side design component in regard to the join of 121 for seamless frame component 120 and column setting up side design component 122. It can guarantee also strength sufficiently by the connecting area which is easy to do fixed job.

In addition, when the form configuration which does not receive the constraint of seamless frame component 120, the upper side design component 121 is located on external side and column setting up side design component 122. As for seamless frame component 120, upper side design component makes use of common ones. For example, the door for the model which differs is produced at the time of, to make 121 and column setting up side design component 122 every model differ. While holding down production cost, with this it is possible to offer the door of various appearance types.

Door corner section 117 as the dot which shows the height design degree of freedom of the design section in the doorframe 112. In door corner section 117 of doorframe 112, as for upper side design component 121, to the position where it is piled up with the top (top back face 123f) of column setting up side design component 122 without following to the arcshaped form of corner bend 120R of seamless frame component 120. It is done in rectilinear condition. Upper side design component 121 and column setting up side design component 122 is connected by the fact that bottom surface 121f and top back face 123f are made to touch at back position of design surface 121a. Namely, because the fixed area of column setting up side design component 122 does not exist on design surface 121a, there are no times when the welding mark and the like remains. Furthermore, design surface 121a has passed without breaking off up to door corner section 117, evenly. Upper side design component 121 and column setting up side design component 122 are superimposed to the bottom surface 121f of the plane which faces to the longitudinal direction of upper side design component 121 and top back face 123f mutually. Precision management of the connecting part is easy and superior in productivity.

Figure 22:
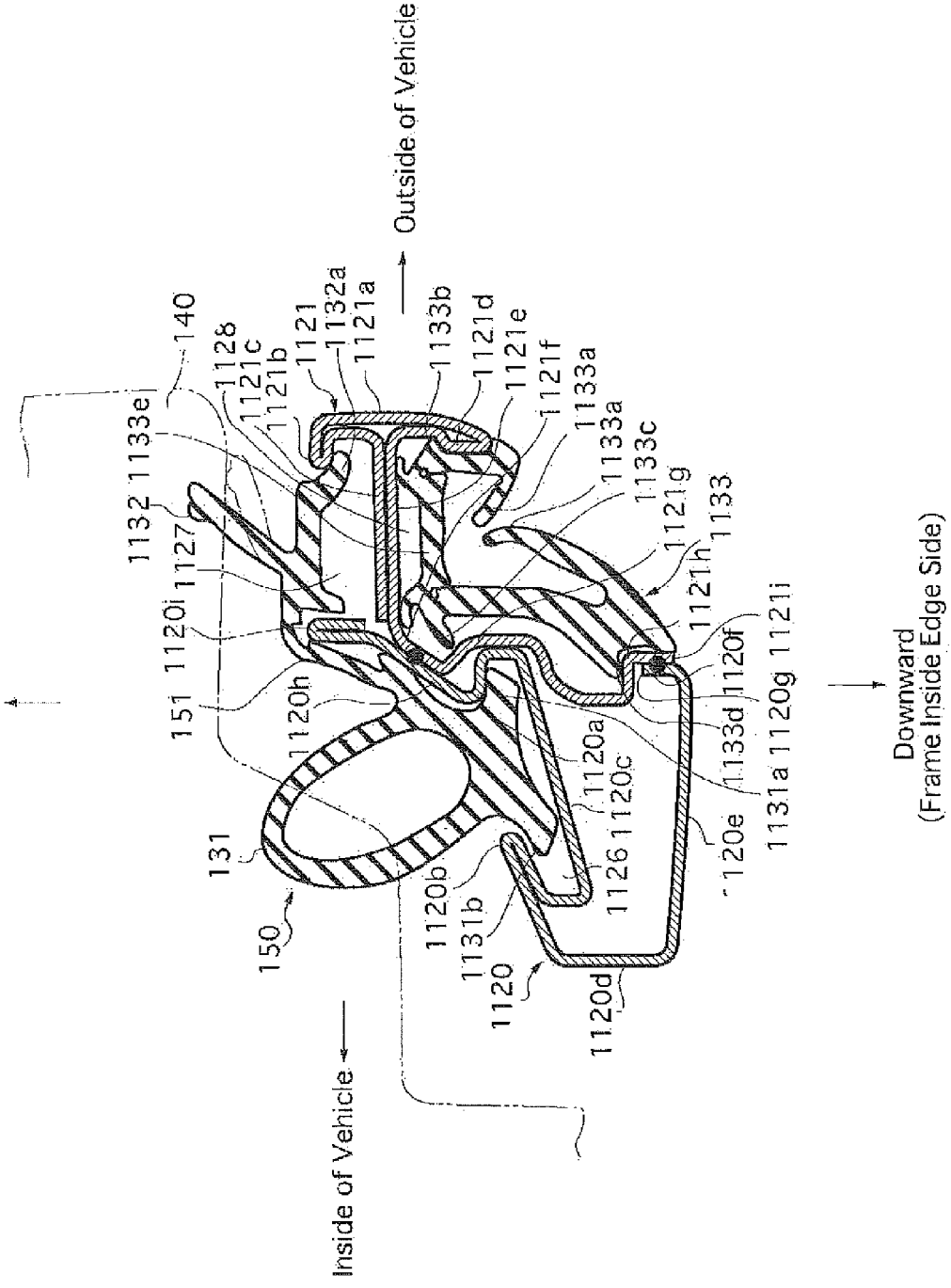
FIG. 22 is a cross section view of upper sashes where the embodiment with different doorframe structure of this invention is shown.

FIG. 22 shows where the second disclosed form of the doorframe structure due to this invention differs. The doorframe of this execution form, the upper side design component, the column setting up side design component and these upper side design components are locked by the interior side of 1121. The external side design section of 1121 forms the external side design section of the upper sash section and the side sash section (column setting up sash section) and the column setting up side design component and extends to the both of the upper sash section and the side sash section and is constituted combining with the seamless frame component (interior side frame component) 1120 of one structure which is continued. As for FIG. 22 because it is something which shows the section of the upper sash section the column setting up side design component of the side sash section is not illustrated, but possesses the configuration which is similar to the execution form ahead.

The seamless frame component 1120 shown in FIG. 22 possesses the bottom surface 1120c of the plane which connects hook section 1120a and said hook section 1120b. The area surrounding hook sections 1120a, 1120b and bottom surface 1120c, directing to frame periphery side, it has become the inner side weather-strip retention groove 1126, which is opened. The open frame section where on bottom side of the strip retention groove 1126, bottom surface 1120c, interior side wall section 1120d, and inner edge wall 1120e. It is surrounded with the time returning wall 1120f at the same time possesses frame open part 1120g between the time returning wall 1120f and bottom surface 1120c forms imperfect tubular (box condition) section. Directing from hook section 1120a to the upper part, tilt slope section 1120h is on the top of tilt slope section 1120h to form the time returning sudden section 1120i.

Upper side design component 1121 in FIG. 22, directs from the top of design surface 1121a of the flange condition which is located on most the external side and the design surface 1121a to an interior side. The bottom surface 1121c follows to hook section 1121b. Bottom surface 1121c and seamless frame component 1120 the area where it is surrounded in returning sudden section 1120i, directing to frame periphery side, it has become the outer side weather-strip retention groove 1127, which is opened. Unlike the upper side design component 1201, in upper side design component 1121, to ahead (interior side) the fin and the like for fixing of seamless frame component 1120 extending is not put out from bottom surface 1121c, bottom surface 1121c has broken off at lower position of the time returning sudden section 1120i.

In addition as for upper side design component 1121, directing to the edge side inside the frame underneath the outer side weather-strip retention groove 1127, it has the glass run retention groove 1128, which is opened. As for glass run retention groove 1128, directing from the bottom of design surface 1121a to interior side, following to 1st fixed surface 1121f and the tilt slope section 1121f which, follow to the bottom surface 1121e of the plane which follows to 1st removal stopping step section 1121d. The 1st removal stopping step section 1121d and the bottom surface 1121e, the 2nd removal stopping step section 1121g is formed to the wall surface section of interior side and 3rd removal stopping step section 1121h and, from 3rd removal stopping step section 1121h 2nd to edge direction inside the frame extending it is formed by with fixed surface 1121i being surrounded.

Seamless frame component 1120 and upper side design component 1121 tilt slope section 1120h and repeats 1st fixed surface 1121f. The time returning wall 1120f and 2nd fixed surface 1121i are combined by locking these superimposed surface parts. It is desirable in fixing of the superimposed surface part to use laser welding. By the fact that upper side design component 1121 is combined with seamless frame component 1120, frame open part 1120g the interior side frame section of hollow section in tube shape (sack condition) is completed by the portion of upper side design component 1121, in the lower part of the inner side weather-strip retention groove 1126.

The weather-strip 150 which is shown in FIG. 22 inner side hollow seal section 1131 is designed to be the integral construction which connects outer side lip section 1132 in terminal area 151. Inner side hollow seal section 1131, engaging in hook section 1120a and 1120b, removal stopping has fit into leg sections 1131a and 1131b into the inner side weather-strip retention groove 1126. Outer side lip section 1132, engages in hook section 1121b. Removal stopping has the fit leg section 1132a which is kept the outer side weather-strip retention groove 1127. Inner side hollow seal section 1131 outer side lip section 1132 becomes deformed respectively, when touching to the roof panel 140 of the vehicle body.

The glass run 1133 which is shown in FIG. 22, has lip section 1133a and retention leg section 1133b and retention lip 1133c and retention leg section 1133d and the bottom 1133e and which, is formed opposite and kept inside glass run retention groove 1128 retention leg section 1133b, retention lip 1133c and retention leg section 1133d, each one 1st or by making 3rd removal stopping step section 1121d, 1121g and 1121h engage. In this retention state, bottom 1133e of glass run 1133 opposes bottom surface 1121e. It is not illustrated in FIG. 22, but glass run 1133, when closing the window glass, keeps the edge elastically.

Figure 23:
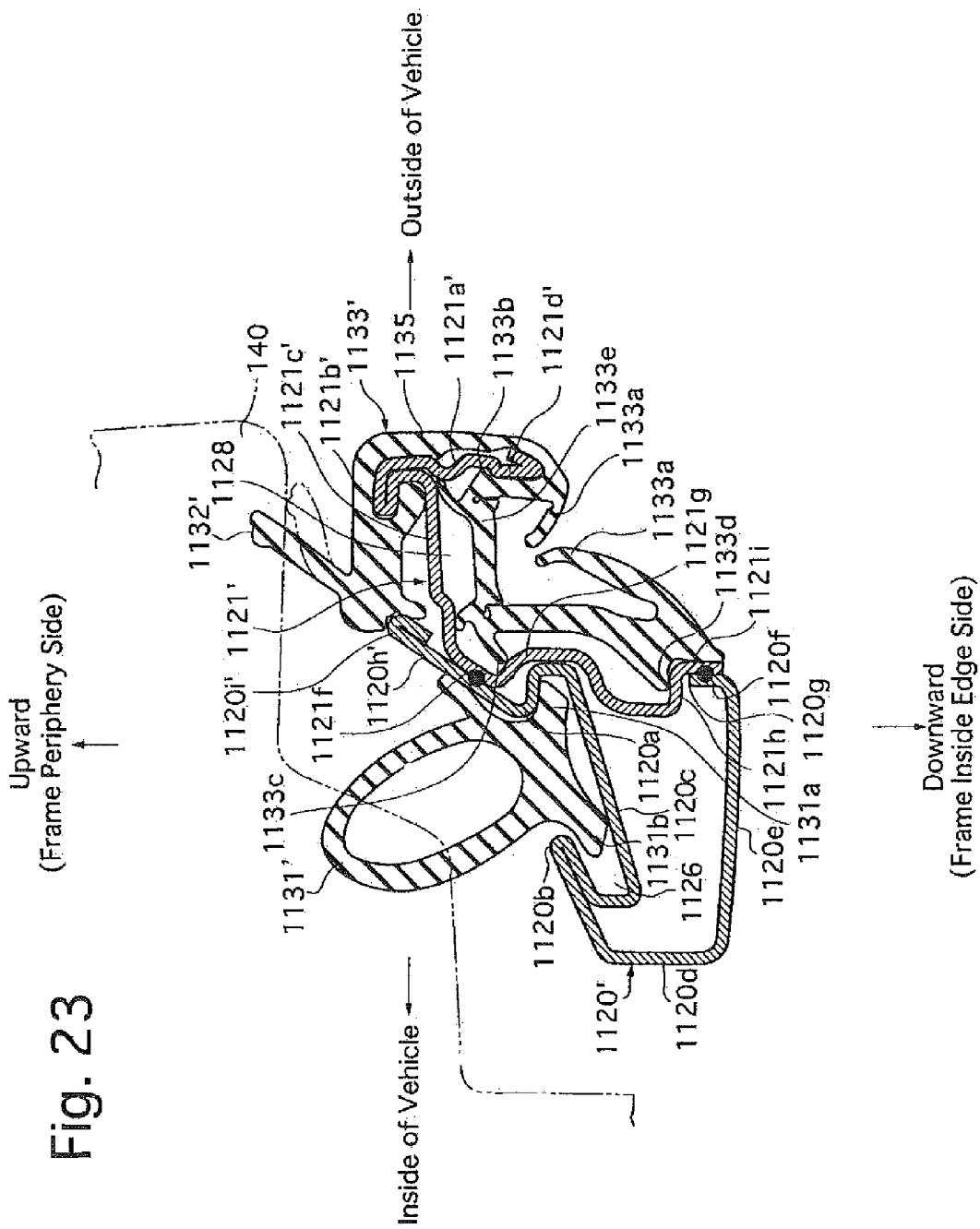
FIG. 23 is a cross section view of upper sashes where the embodiment with different further doorframe structure of this invention is shown.

FIG. 23 shows with the same code concerning the part which is in common with FIG. 22. The upper sash section of the doorframe which shows in FIG. 23, in order the glass run 1133' design surface 1121a' of the upper side design component 1121' to cover, extends to frame periphery side. It has become the design section of generally known as the glass-run hidden type.

As for the upper side design component 1121', the outer side weather-strip retention groove the base section of 1127 and the glass run retention groove 1128 is formed common bottom surface 1121c'. It is the same structure as the upper side design component 1121 in FIG. 22. This bottom surface 1121c' in regard to interior side. As for the 1st removal stopping step section 1121d' bottom, it has become the edge which is bent to external side.

As for the glass run 1133', the glass run appearance section the outer side lip section 1132' which is kept inside 1135 which covers outside design surface 1121a', which is kept inside glass run retention groove 1128. Outer side weather-strip retention groove 1127 is formed as one unit. The inner side hollow seal section 1131' is formed inside inner side weather-strip retention groove 1126 as another body from the outer side lip section 1132' of the glass run 1133'. The outer side lip section 1132' with the inner side hollow seal section 1131' forms weather-strip which contacts roof panel 140 elastically. Hook section 1121b' of the upper side design component 1121' relates to fit leg section 1132a'. The edge of opposite interior side of the seamless frame component 1120' returning sudden section 1120i' engages fit leg section 1132a'. The seamless frame component 1120', having returning sudden section 1120i' and tilt slope section 1120h' the area where it extends, is the configuration which is similar to the seamless frame component 1120 in FIG. 22.

The seamless frame component 1120' and the upper side design component 1121', tilt slope section 1120h' 1st fixed surface 1121f and the returning wall 1120f and 2nd fixed surface 1121i, respectively, are unified by locking surface part with laser welding and the like. In FIG. 23, the outer side weather-strip retention groove bottom surface 1121c' doing the base of 1127 and the glass run retention groove 1128 lightweight conversion is assured.

Generally, the glass window which is supported in the doorframe, sucking out power to the external side impacts in the high-speed run time of the vehicle. FIG. 24 is the embodiment which assures the rigid rise for this kind of glass sucking out power. Those features in FIG. 24 concerning the parts which are in common with FIG. 20, are abbreviated in the explanation of the areas of overlap.

The seamless frame component (interior side frame component) 1220 and upper side design component 1221 are within seamless frame component 120 in FIG. 20. Upper side design component 121 and the bottom surface 120c forms the base section of the inner weather-strip retention groove 126. At the dot, 1st fixed fin 121d is fixed. This bottom surface 120c and the being superimposed fixed part by 1st fixed fin 121d is designated as the 1st fixed part, in FIG. 24. Configuration of the 2nd fixed part differs. Seamless frame component 1220 of seamless frame component 120 in FIG. 20 does not have the part where it is suitable to returning wall 120f, the point (edge which faces to external side) of inner edge wall 120e approximately 180 degrees has become the folding section 1220f. Upper side design component 1121 locks without making the stand wall 1221h which is suitable to the 2nd fixed fin 121h of upper side design component 121 in FIG. 20 seamless frame component 1220. From the stand wall 1221h directing to interior side, following to step section 1221i and the step section 1221i which it engages in folding section 1220f it has possessed with the 2nd fixed fin 1221j which contacts inside edge wall 120e. Inner edge wall 120e and 2nd fixed fin 1221j is locked by laser welding, etc. The particular fixed portion becomes the 2nd fixed part. Namely, seamless frame component 1220 and upper side design component 1121, the 1st fixed part (bottom surface 120c and 1st fixed fin 121d) and the 2nd fixed part (inner edge wall 120e and 2nd fixed fin 1221j) respectively, becomes the fixed part where, in a vehicle top and bottom direction (direction which door thickness direction crosses), the board is adjusted. Especially, through window glass 114, sucking out power to external side it operates the glass run 133, inner edge wall 120e and if it is the fixed part by 2nd fixed fin 1221j, it is possible to guarantee strength securely.

Furthermore, as for FIG. 24 the upper sash section is designated as an example, but regarding the side sash section it is possible to raise the rigidity for the glass sucking out power to external side with a similar structure. It abbreviates illustration, but if the seamless frame component 120 in FIG. 21 and column setting up sub component 124, the returning wall 120f and fixed fin 124f, is not the structure which is contacting door thickness direction and contacts vehicle front and back direction.

In FIG. 24, as for fixed place of the frame component of interior side and the design component of external side, it is possible regarding the doorframe structure of this invention, to configurate to the position of desire in compliance with the cord condition such as cross section of strength and the respective component which are required.

Figure 25:
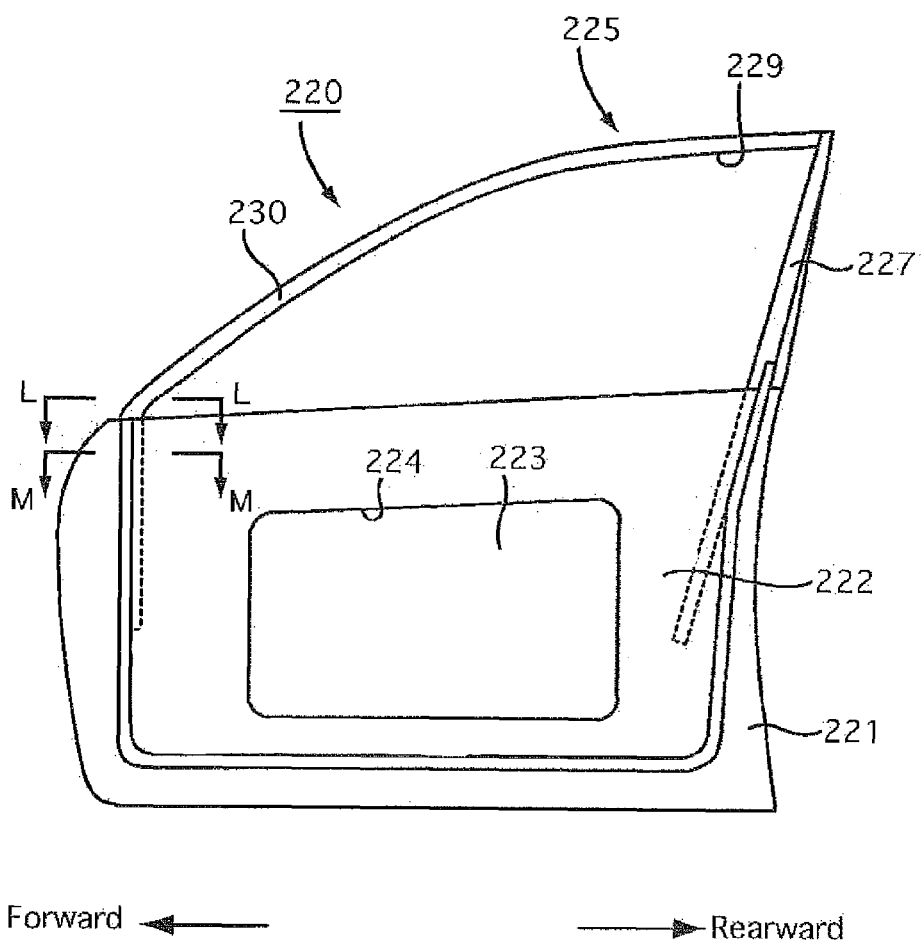
FIG. 25 is a side elevation view of the door of the car that applies one embodiment of this invention with the door trim detached.
Figure 31:
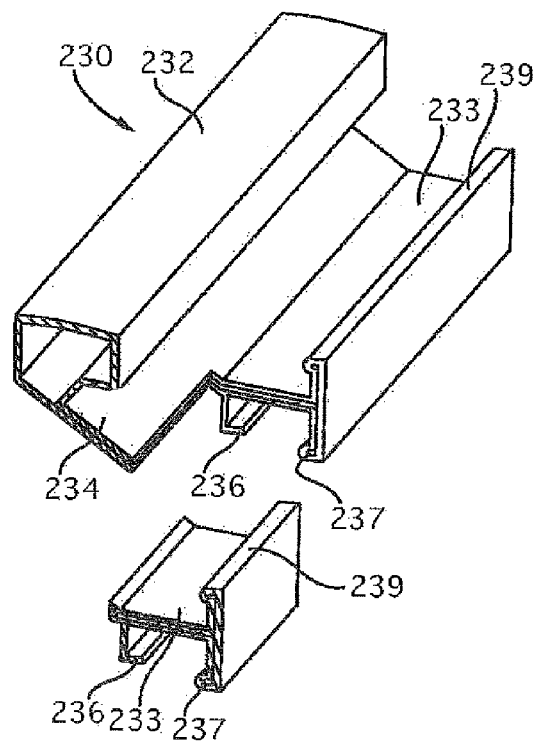
FIG. 31 is an oblique perspective view of the part cut from the bottom part of the door sash and the bottom part of the door sash.

FIG. 25 or FIG. 31 may show the third embodiment of the doorframe structure due to this invention. This third embodiment, without the doorframe structure of the vehicle where the bottom of the door sash is connected to the external side of the inner panel of the vehicle door, the bottom of the buff component retention section, the weather-strip retention section and the glass run retention section of the door sash is something which makes disconnection possible damaging the sack section with the rectilinear disconnection job of the one time due to a disconnection tool.

As for FIG. 25, in door open part 210 of the vehicle body (FIG. 26 and FIG. 27) front end of the door 220, which opens and closes unrestrictedly, is installed. The passing flight position which was seen from interior side the door trim and when weather-strip WS2 is removed.

The inner panel (door panel) 221 which is the component of door 220 is made of metal. The part where the front and back both edge and the sill of inner panel 221 are excluded has become the swelling section 222 which swells facing toward interior side. The window regulator and the like illustrated by inner panel job hole 224 in order to install in the space with inner panel 221 and outer panel 223 is done in the central part of swelling section 222.

The bottom of door sash 225 is connected to the external side of swelling section 222. Door sash 225 has, the leading edge of door sash 225 and the upper sash of the side sash 227 which extends in the top and bottom direction which forms 230 which forms the rising wood and the trailing edge. These upper sashes 230 and side sash 227 may be made with metal.

Figure 27:
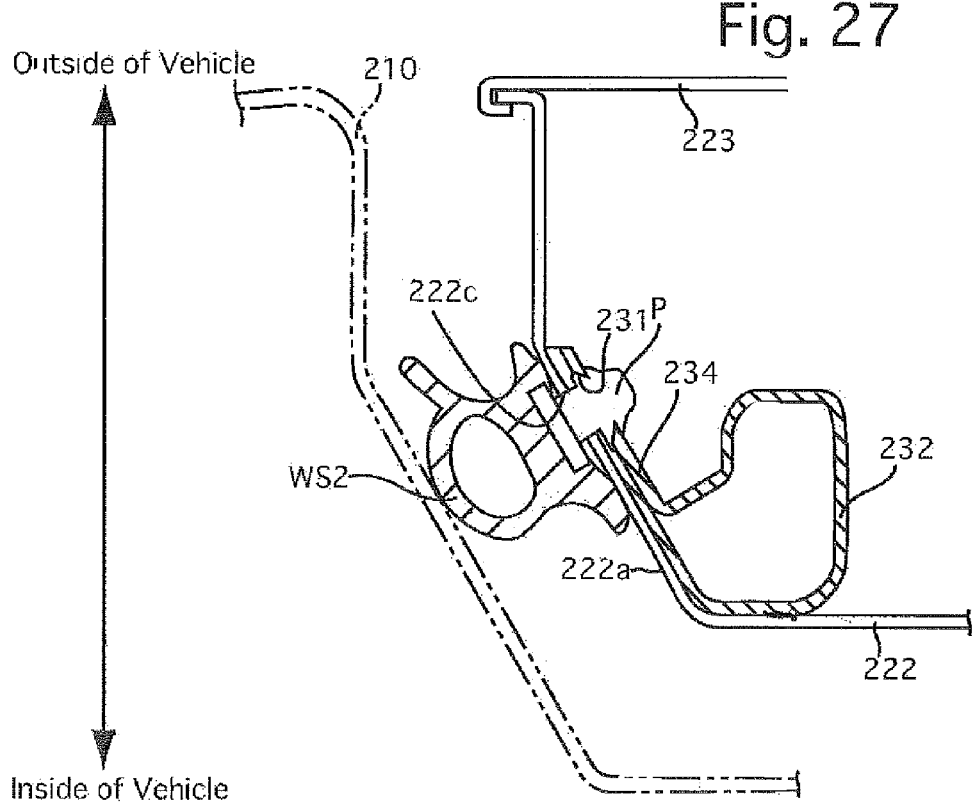
FIG. 27 is a cross section view along M-M Line of FIG. 25.

As shown in FIG. 25, the bottom of upper sash 230 is opposed with the external side of swelling section 222, as shown in FIG. 27. The interior side of sack section 232 and the front two aspects of terminal area 234 are welded, on the external side (opposition aspect of upper sash 230) of swelling section 222. Furthermore, as shown in FIG. 25, the bottom of side sash 227 opposite with the external side of swelling section, 222 on the external side (opposition aspect of side sash 227) of swelling section 222 is welded.

Figure 26:
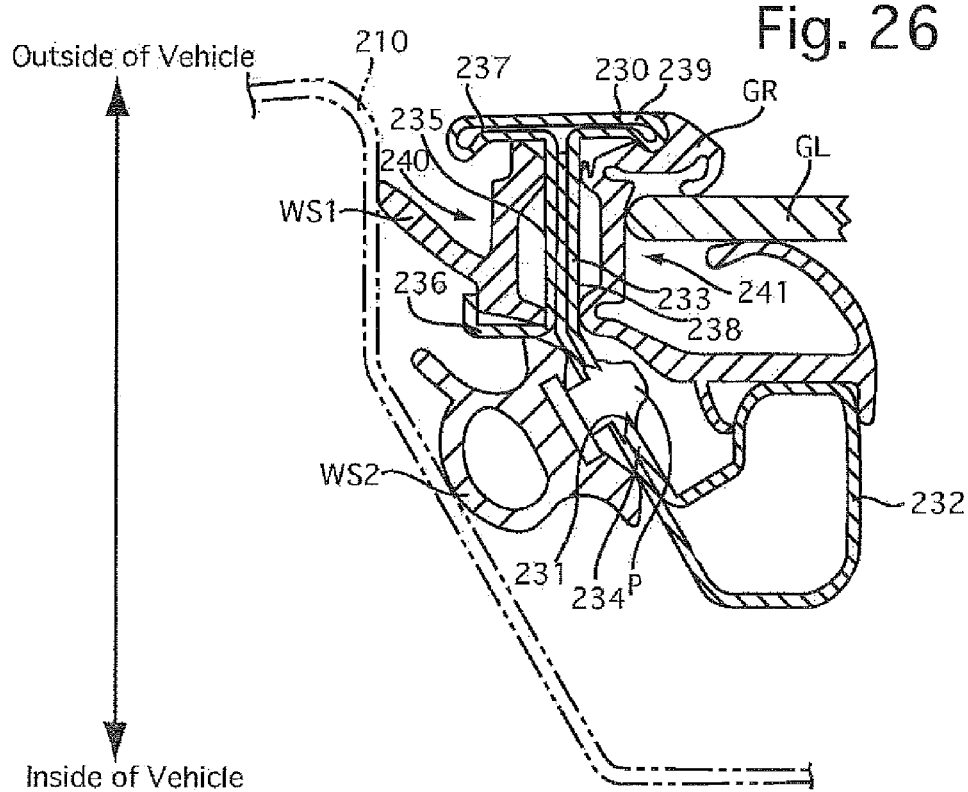
FIG. 26 is a cross section view along L-L line of FIG. 25.

The window hole 229 is formed to the part which is surrounded upper sash 230, side sash 227 and swelling section 222. Upper sash comprises elastic material such as rubber forms the glass run GR which is installed in the inside perimeter aspect of 230 and side sash 227. Furthermore, the window hole slide glass GL fits to the window hole 229, as shown in FIG. 26, the slide glass GL margin sliding possibly has fit to glass run GR. Therefore, as for slide glass GL in upper sash paralleling 230 (glass run GR) and side sash 227 (glass run GR), it is possible to slide in top and bottom direction.

Upper sash from swelling section 222 of the peripheral aspect of 230 and side sash 227, the weather-strip WS1 is formed by elastic material such as rubber applies in the part where it is located to the upper part. Furthermore, as shown in FIG. 26, the whole surface (the front 222a, underside, and rear) outer circle of swelling section 222 and upper sash from swelling section 222 of the peripheral aspect of 230 and side sash 227 as balance with the weather-strip WS1 is formed. The annular weather-strip WS2, located on the interior side, is installed in the part where it is located by the upper part, from the weather-strip WS1 multiple engagement pins P in upper sash 230 by fitting with the through hole 222c which is done in the mounting hole 231. When door 220 is closed, the weather-strip WS1 and the weather-strip WS2 contact the margin of door open part 210 of the vehicle body (FIG. 26 and FIG. 27), to door seal between 220 and door open part 210.

Figure 28:
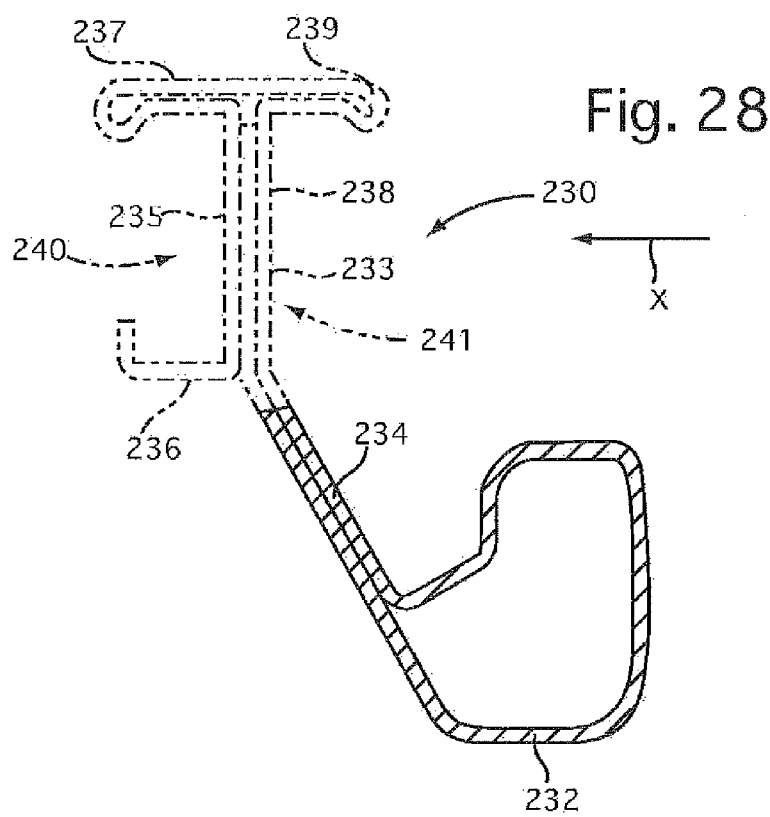
FIG. 28 is a cross section view of the bottom part of the door sash.

Next, upper sash 230 is disclosed in detail. Upper sash 230 pulls and pulls out and bends and as rectilinear ones of the cross section which is shown in FIG. 26 and FIG. 28 (section of position of the entire of longitudinal direction is even,) roll formation or after forming by formation, makes the form in FIG. 25 by being processed. In upper sash 230 over the total length, hollow tubular sack section 232 and, (when door 220 is closed) buff component retention section 233 of the flat condition extends to car cross direction and sack section terminal area. The inside perimeter side sudden provision (weather-strip retention section) where from both sides edge of the front 235 of the 234 of the flat condition which connects 232 and buff component retention section 233. The buff component retention section 233 projects to forward 236 and peripheral side sudden provision (weather-strip retention section), protruding from the external side edge of rear 238 of the 237. The buff component retention section 233 projects to the rear provision (glass run retention section) 239. The front 235 of the buff component retention section 233, inside perimeter side sudden provision the weather-strip retention groove 240 which it fits keeps the inside perimeter side end of the weather-strip WS1 formed between 236 and peripheral side sudden provision 237. Rear 238 of the buff component retention section 233, sudden provision the glass run retention groove 41 which it fits keeps the peripheral side end of glass run GR is formed between 239 and sack section 232.

As for upper sash 230 of this kind of cross section, as shown in FIG. 28, when in the direction (arrow X direction) which crosses buff component retention section 233, buff component retention section 233, inside perimeter side sudden provision 236, peripheral side sudden provision 237 or sudden provision 239, does not overlap with sack section 232 (having slipped in car cross direction).

Buff component retention section 233, inside perimeter side sudden provision 236, peripheral side sudden provision 237 and sudden provision 239 are formed to one body in upper sash 230. As shown in FIG. 27 and FIG. 28, the buff component retention section 233 in the bottom (part which opposes with swelling section 222 of inner panel 221) of upper sash 230, relates to inside perimeter side sudden provision 236, peripheral side sudden provision 237, sudden provision as for the side edge of buff component retention section 233 side of 239 and terminal area 234. Because it is disconnected after (or to pull, to pull out, after the forming) the roll forming, sack section only portion of 232 and terminal area 234 is left to the bottom of upper sash 230.

When the bottom of upper sash 230 is disconnected, as shown in FIG. 27, plane surface apparent in the front of the terminal area 234 and the front 222a of the swelling section 222 continues without the difference in level. Upper sash regarding the joint of 230 and swelling section 222, the inside perimeter side end of the weather-strip WS2, it is possible to make the front of the terminal area 234 and the front 222a of the swelling section contact 222 without the opening.

Figure 29:
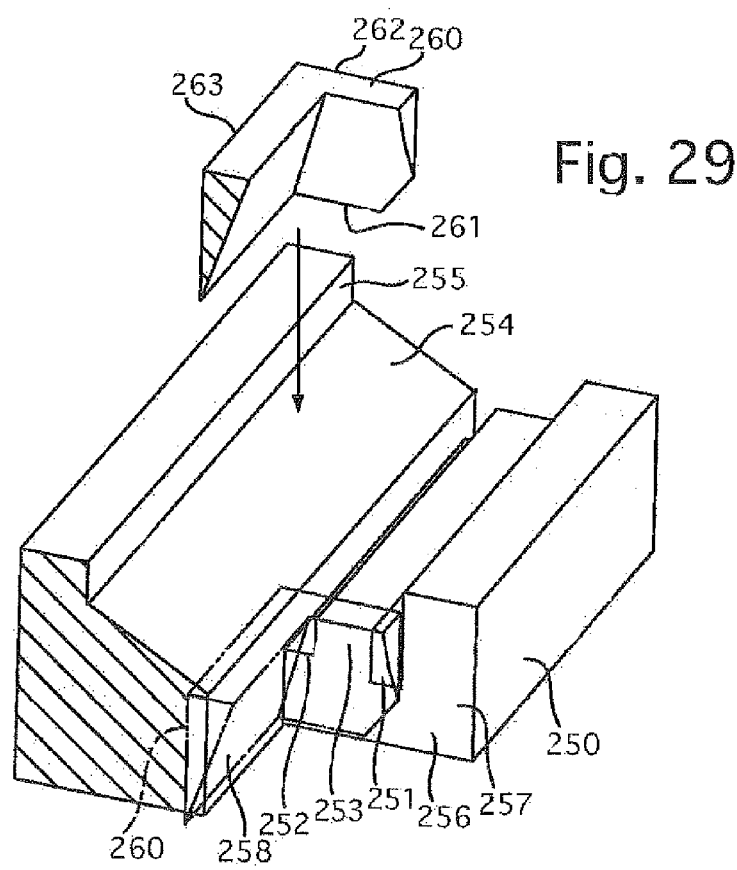
FIG. 29 is an oblique perspective view of the treatment device and the cutting tool.

Next, the disconnection main point of the bottom of upper sash 230 is shown by FIG. 31 from FIG. 29 and jig 250 and disconnection tool 260. The groove 251 extends to the longitudinal direction rectilinear and the groove 252 is done in the surface of jig 250. The groove support sudden provision 253 where that surface forms the compressed aspect is formed between 251 and the groove 252. Furthermore the inclined back face 254 which extends to the longitudinal direction rectilinear and the inclined back face 254 and perpendicular facing 255 is formed in the surface of jig 250. Furthermore, the whole part of groove 251 cuts from the inclined back face 254 in the end of one side of longitudinal direction of jig 250. The end face of notch 256 of the 1st plane surface has become 257 which crosses mutually with 2nd plane surface 258.

Disconnection tool 260 is the component where cross section (plane surface form) forms an L shape. The underside becomes tooth 261. Furthermore, the 1st tangential plane 263 is parallel with the 2nd plane surface 258. Plane 262 is parallel with the 1st plane surface 257 of jig 250. Jig 250 is formed on the outer part surface of disconnection tool 260. Furthermore, notch 256 of jig 250 and disconnection tool 260 are the same length (FIG. 25) which opposes with the swelling section 222 of upper sash 230.

Figure 30:
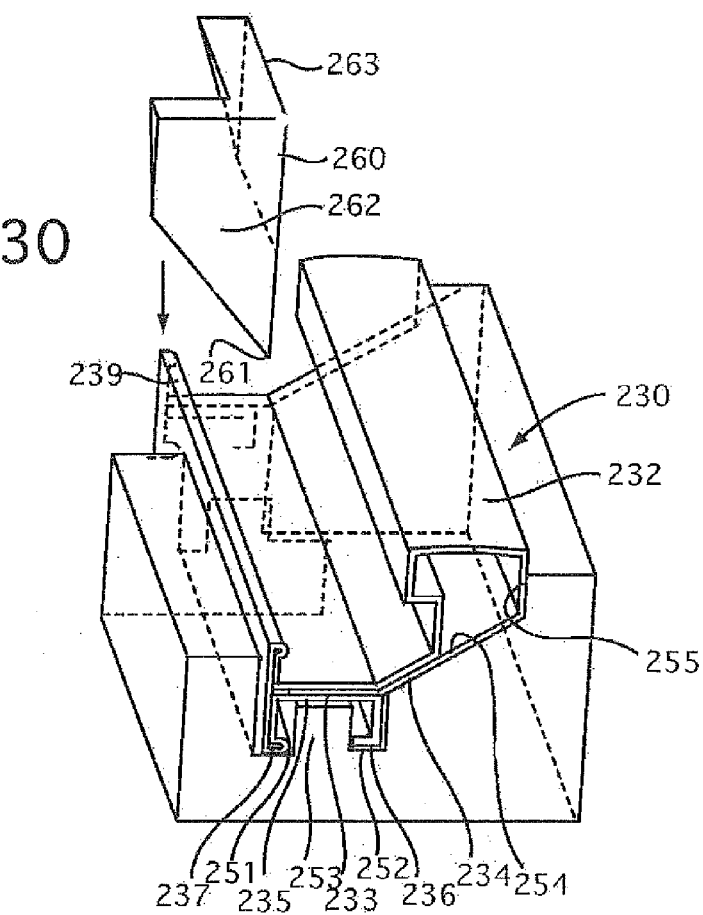
FIG. 30 is an oblique perspective view that shows the door sash on the treatment device, and shows the appearance in which the bottom part of the door sash with the cutting tool is cut.

To do a disconnection job, first, as shown in FIG. 30, directing the front of the upper sash 230 to the lower part, inside perimeter side sudden provision 236 and peripheral side sudden provision 237 in the groove it fits 252 of jig 250 and the groove 251 respectively. When it does, the front (jig contact surface) 235 of the buff component retention section 233 is supported by the surface of support sudden provision 253. It is supported terminal area the front (jig this contact surface) of the 234 and the sack section 232 by the inclined back face 254, furthermore the interior side (jig this contact surface) of sack section 232 contacts with perpendicular facing 255. When upper sash 230 is supported with jig 250 this way, as shown in FIG. 29 and FIG. 30, disconnection tool 260 is made to move to just above of notch 256 of jig 250, (1st tangential plane 262 and 1st plane surface 257, and 2nd tangential plane being located 263 and 2nd plane surface 258 with respect to the respective same plane). When disconnection tool 260 is made to move to the lower part (Figure arrow direction of 29 and FIG. 30), as for disconnection tool 260 while 1st tangential plane 262 and 2nd tangential plane 263 1st plane surface making 257 of jig 250 and 2nd plane surface touch respectively, the buff component retention section 233 in the bottom of upper sash 230 with the tooth 261, inside perimeter side sudden provision 236, peripheral side sudden provision 237, disconnects the side edge of buff component retention section 233 side of 239 and terminal area 234 (FIG. 31).

As above explained, because upper sash 230 of the third embodiment, when viewed from the direction (arrow X direction in FIG. 28) which crosses buff component retention section 233, buff component retention section 233, inside perimeter side sudden provision 236, is the cross section where peripheral side sudden provision 237 or sudden provision 239 does not overlap with sack section 232, with disconnection tool 260 buff component retention section 233, inside perimeter side sudden provision 236, peripheral side sudden provision 237, sudden provision the bottom of the side edge of buff component retention section 233 side of 239 and terminal area 234 use the straight line. It can disconnect with a disconnection job, without damaging sack section 232. Therefore, in order to process the bottom of the door sash, processing (disconnection) the bottom of upper sash 230 is easy.

Furthermore, because at the time of the disconnection job the front 235 of the buff component retention section 233 of the upper sash 230, terminal area the front of the 234 and the sack section 232, and the interior side of sack section 232 the surface of support sudden provision 253 of jig 250, supports respectively in the inclined back face 254, and perpendicular facing 255, it is possible to do securely.

In addition, as for upper sash 230 of the third embodiment, although buff component retention section 233, inside perimeter side sudden provision 236, peripheral side sudden provision 237 and sudden provision the end of buff component retention section 33 side of 239 and terminal area 234 is excised from the bottom, as for most of terminal area 234 is left without being excised. Because of that, because the interior side of sack section 232 and the front two aspects of terminal area 234 can be welded on the external side (opposition aspect of upper sash 230) of swelling section 222. The bottom and swelling section 222 of upper sash 230 (inner panel 221) can be connected firmly.

The third embodiment while experiencing various deformations, is disconnection possible. For example, as shown in FIG. 26, when seeing from the inside perimeter side of door sash 230, because terminal area 234 exposes sack section through the opening between 232 and glass run retention section 239, disconnection direction of disconnection tool 260 is not limited to arrow X direction. Namely, the straight line showing the direction move which crosses disconnection tool 260, the terminal area 234, it can disconnect terminal area 234 once by making terminal area contact 234 sack section through the opening between 232 and glass run retention section 239.

Furthermore, with the embodiment, buff component retention section 233, inside perimeter side sudden provision 236, not only peripheral side sudden provision 237 and sudden provision 239, also the side edge of buff component retention section 233 side of terminal area 234 is disconnected with disconnection tool 260, but buff component retention section 233, inside perimeter side sudden provision 236, peripheral side sudden provision also it is possible to execute with the feature which disconnects only 237 and sudden provision 239. In addition, it designates the bottom of side sash 227 as the same cross section, as upper sash 230. It is possible to disconnect the bottom of side sash 227 with the same main point as description above of jig 250 and disconnection tool 260.

The feature part and the effect in the third embodiment of FIG. 25 to FIG. 31 are enumerated.

INDUSTRIAL APPLICABILITY

The door sash structure of the present invention can be widely applied to a vehicle door structure having an upright-pillar sash member and an upper sash member (12).

The invention claimed is:

1. A vehicle door frame structure comprising an upright-pillar sash member (13) elongated in a vertical direction of a vehicle door (10) and an upper sash member (12), which is formed as a separate member from said upright-pillar sash member and forms an upper edge of said vehicle door, wherein said upright-pillar sash member and said upper sash member are joined together at an upper end of said upright-pillar sash member,
    wherein at a linear end portion of said upper sash member on an upright-pillar sash member side, said upper sash member comprises a designed portion (22) exposed outside of said vehicle door, and an inner frame portion (24) which is formed having a hollow sectional shape and is positioned closer to an inside of a vehicle than said designed portion;
    wherein said upright-pillar sash member comprises, at said upper end thereof, a superposed contact portion which has a substantially U-shaped cross sectional shape formed by pressing, and which is inserted into and superposed on an end of said hollow inner frame portion of said upper sash member; and
    wherein said inserted and superposed contact portion and said inner frame portion are joined together while being superposed on each other.

2. The vehicle door frame structure according to claim 1, wherein said inner frame portion (24) is shorter in length than said designed portion.

3. The vehicle door frame structure according to claim 1, wherein said upright-pillar sash member comprises an arc-shaped bent portion (36f) at the upper end of said upright-pillar sash member, said arc-shaped bent portion being curved toward said linear end portion of said upper sash member, and wherein said inserted and superposed contact portion is formed on said arc-shaped bent portion.

4. The vehicle door frame structure according to claim 2, wherein said upright-pillar sash member comprises an arc-shaped bent portion (36f) at the upper end of said upright-pillar sash member which extends, said arc-shaped bent portion being curved toward said linear end portion of said upper sash member, and wherein said inserted and superposed contact portion is formed on said arc-shaped bent portion.

5. The vehicle door frame structure according to claim 3, wherein said upright-pillar sash member extends along a center pillar (51).

6. The vehicle door frame structure according to claim 4, wherein said upright-pillar sash member extends along a center pillar (51).

* * * * *

UNITED STATES PATENT AND TRADEMARK OFFICE
CERTIFICATE OF CORRECTION

PATENT NO.       : 8,458,959 B2
APPLICATION NO. : 12/593645
DATED            : June 11, 2013
INVENTOR(S)      : Ohtake et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 846 days.

Signed and Sealed this
Eighth Day of September, 2015

Michelle K. Lee
*Director of the United States Patent and Trademark Office*